(12) United States Patent
Treichler et al.

(10) Patent No.: US 6,779,069 B1
(45) Date of Patent: Aug. 17, 2004

(54) COMPUTER SYSTEM WITH SOURCE-SYNCHRONOUS DIGITAL LINK

(75) Inventors: Sean J. Treichler, Mountain View, CA (US); Edward W. Liu, Milpitas, CA (US)

(73) Assignee: Nvidia Corporation, Santa Clara, CA (US)

( * ) Notice: Subject to any disclaimer, the term of this patent is extended or adjusted under 35 U.S.C. 154(b) by 47 days.

(21) Appl. No.: 10/235,143

(22) Filed: Sep. 4, 2002

(51) Int. Cl.[7] .............................................. G06F 13/00
(52) U.S. Cl. ........................ 710/305; 710/62; 710/29; 375/219
(58) Field of Search ........................ 710/1, 5, 84, 416, 710/3.07, 234.1, 305–315, 110–112, 117, 62–64, 71–74, 29–41; 455/324, 84, 127.1, 416; 375/219–222, 225, 438, 445; 709/229–234

(56) References Cited

U.S. PATENT DOCUMENTS

| | | | | |
|---|---|---|---|---|
| 5,436,902 A | * | 7/1995 | McNamara et al. | 370/447 |
| 5,787,360 A | * | 7/1998 | Johnston et al. | 455/524 |
| 6,243,413 B1 | * | 6/2001 | Beukema | 375/222 |
| 6,282,714 B1 | * | 8/2001 | Ghori et al. | 725/81 |
| 6,463,096 B1 | * | 10/2002 | Raleigh et al. | 375/225 |
| 6,526,264 B2 | * | 2/2003 | Sugar et al. | 455/84 |
| 6,564,050 B1 | * | 5/2003 | Ramey et al. | 455/416 |

OTHER PUBLICATIONS

Jon "Hannibal" "API Networks Launches Switch; Hyper-Transport Moves Closer," printed Aug. 27, 2002, from www.arstechnica.com, pp. 1–3 of 4.
"Features Chart," from www.hypertransport.org/technology.html, printed Aug. 27, 2002, p. 1 of 1.
"The NVIDIA nFORCE™ IGP," from www.hypertransport.org/featuredproducts/fp nvidia IGP.html, printed Aug. 27, 2002, p. 1 of 1.

* cited by examiner

Primary Examiner—Christopher B. Shin
(74) Attorney, Agent, or Firm—Moser Patterson & Sheridan LLP

(57) ABSTRACT

Apparatus for a baseband-media interface is described. More particularly, in an embodiment, a baseband processor, a medium access controller and a baseband-media interface are provided with a input/output controller as an integrated circuit. In another instance, a baseband processor, a medium access controller and a baseband-media interface are provided on a printed circuit board and coupled to an input/output controller via a bus. The printed circuit board may be a system board or a peripheral card.

22 Claims, 24 Drawing Sheets

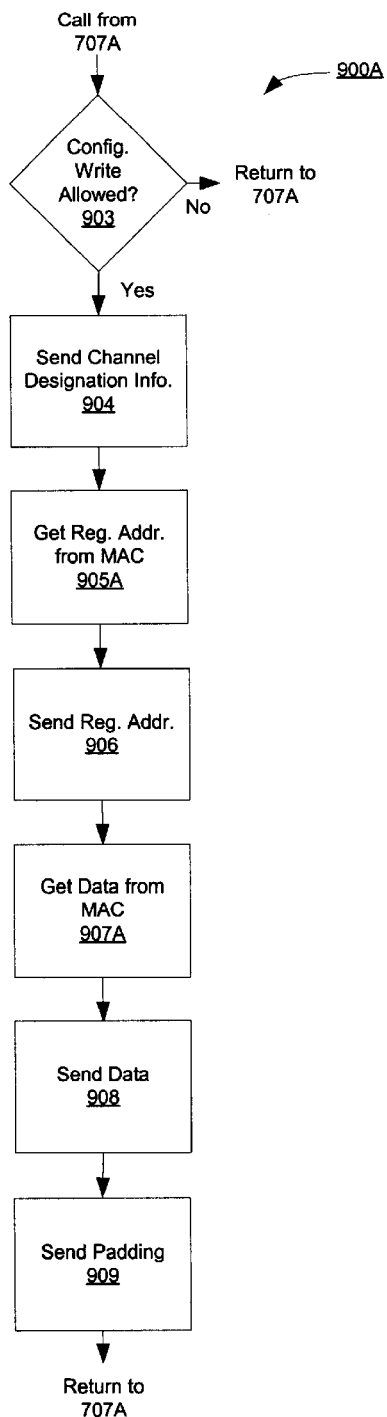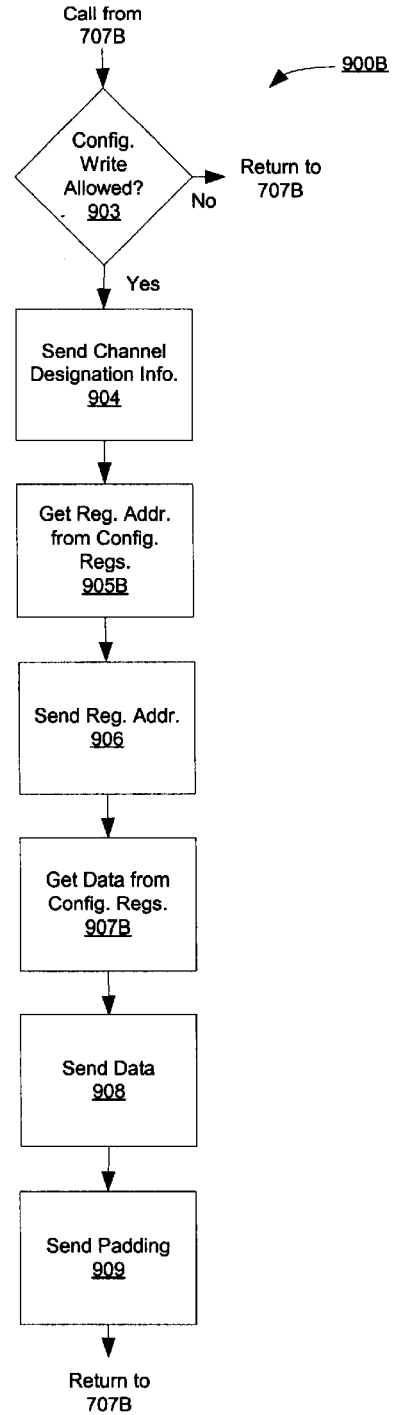
Fig. 9A
Fig. 9B

COMPUTER SYSTEM WITH SOURCE-SYNCHRONOUS DIGITAL LINK

BACKGROUND

Wireless communication is becoming more prevalent, especially with respect to data transmissions. The Institute for Electronic and Electrical Engineers (IEEE) and other organizations have promulgated wireless communication applications, which have become industry standards. However, these applications may differ by data width or frequency of operation.

Accordingly, it would be desirable to provide a computer system that facilitates configuration of a radio to accommodate different applications.

SUMMARY

A computer system is described comprising a processor and having an input/output controller integrated circuit coupled to the processor, where the input/output controller integrated circuit includes a peripheral bus interface, a baseband processor, a medium access controller and a baseband-media interface. The baseband processor is coupled to the medium access controller, and the medium access controller and the baseband processor are coupled to the baseband-media interface.

Another computer system is described comprising a processor, an input/output controller coupled to the processor, a medium access controller coupled to the input/output controller via an external bus, a baseband processor coupled to the medium access controller, a baseband-media interface coupled to the medium access controller and the baseband processor, and a printed circuit board. The printed circuit board has external bus connectivity and has mounted thereon the baseband-media interface, the baseband processor and the medium access controller.

Another aspect of the present invention is single integrated circuit die forming a integrated graphics processor and controller including a medium access controller, a baseband processor and a medium access controller/baseband processor digital interface for communicating with a radio.

BRIEF DESCRIPTION OF THE DRAWINGS

FIGS. 9A and 9B are flow diagrams of exemplary embodiments of configuration write subroutines in accordance with one or more aspects of the present invention.

FIGS. 12-1 through 12-6 are diagrams of exemplary embodiments for implementing a radio-baseband link in accordance with one or more aspects of the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1A:
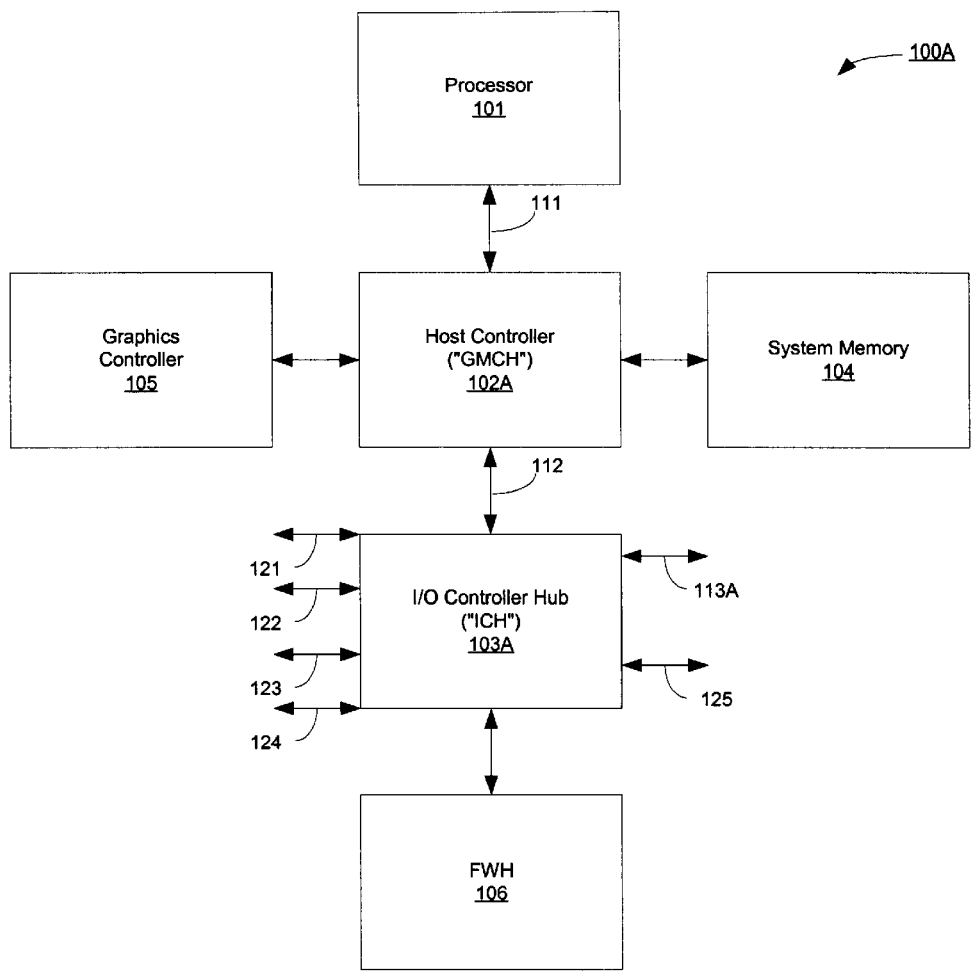
FIGS. 1A, 1B, 1C and 1D are block diagrams of exemplary embodiments of respective computer systems in accordance with one or more aspects of the present invention.

FIG. 1A is a block diagram of an exemplary embodiment of a computer system 100A in accordance with one or more aspects of the present invention. Computer system 100A comprises processor 101, host controller 102A, graphics controller 105, system memory 104, input/output (I/O) controller hub 103A and firmware hub 106 (FWH). Bus 111 coupling processor 101 to host controller 102A may be front side bus (FSB). Accordingly, computer system 100A may be a hub architecture, also known as an Intel hub architecture (IHA), where host controller 102A is a graphics memory controller hub ("GMCH") and I/O controller hub ("ICH") 103A is coupled to host controller 102A via a hub-to-hub interface 112. I/O controller hub 103A includes a controller for PCI bus 113A. In accordance with one or more aspects of the present invention, I/O controller hub 103A comprises a baseband processor (BBP) and a medium access controller (MAC). I/O controller hub 103A may further comprise controllers for System Management Bus (SMBus 121), Universal Serial Bus (USB 122), General Purpose I/O (GPIO 123), Integrated Device Electronics (IDE 124), and Low Pin Count (LPC 125) busses. The I/O controller hub can be a single integrated circuit or single semiconductor platform.

Figure 1B:
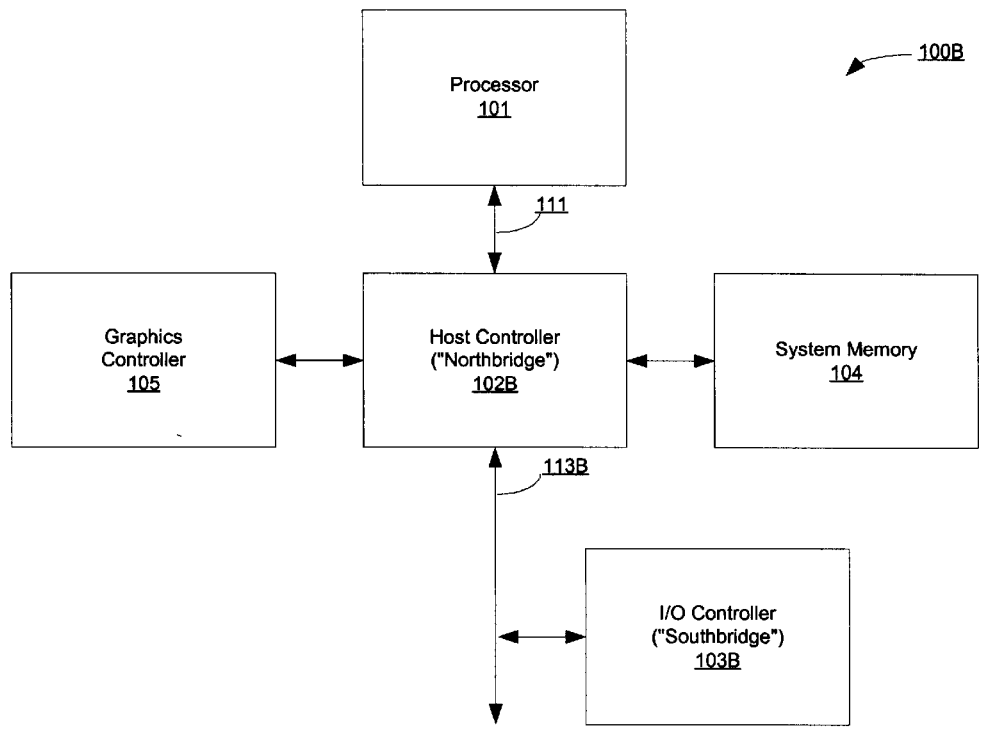

FIG. 1B is a block diagram of an exemplary embodiment of a computer system 100B in accordance with one or more aspects of the present invention. Computer system 100B of FIG. 1B is similar to computer system 100A of FIG. 1A, except that host controller 102B comprises a PCI controller for coupling to PCI bus 113B. Another difference is that I/O controller 103B is coupled to host controller 102B via PCI bus 113B. This architecture is a Northbridge/Southbridge architecture, where host controller 102B is a Northbridge chip and I/O controller 103B is a Southbridge chip. Additional busses may be coupled in a known manner. The graphics controller 105 can be incorporated into the Northbridge chip. Alternatively, the host controller 102B and the I/O controller 103B can be on a single integrated circuit or single semiconductor platform.

Figure 1C:
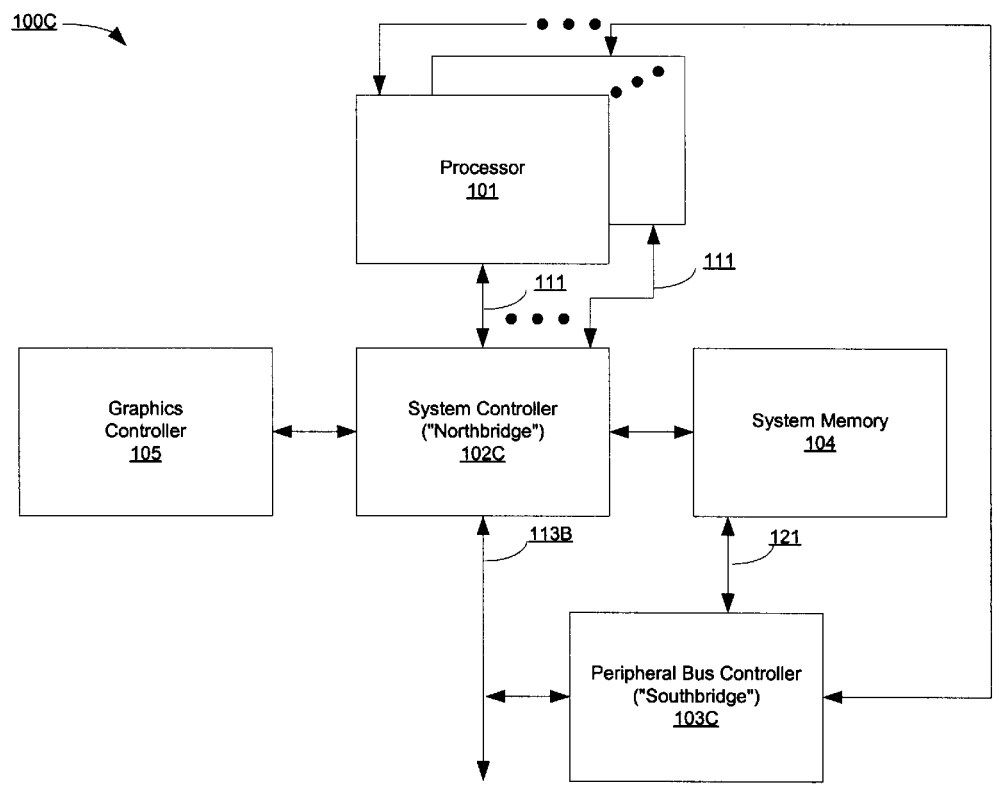
Figure 1D:
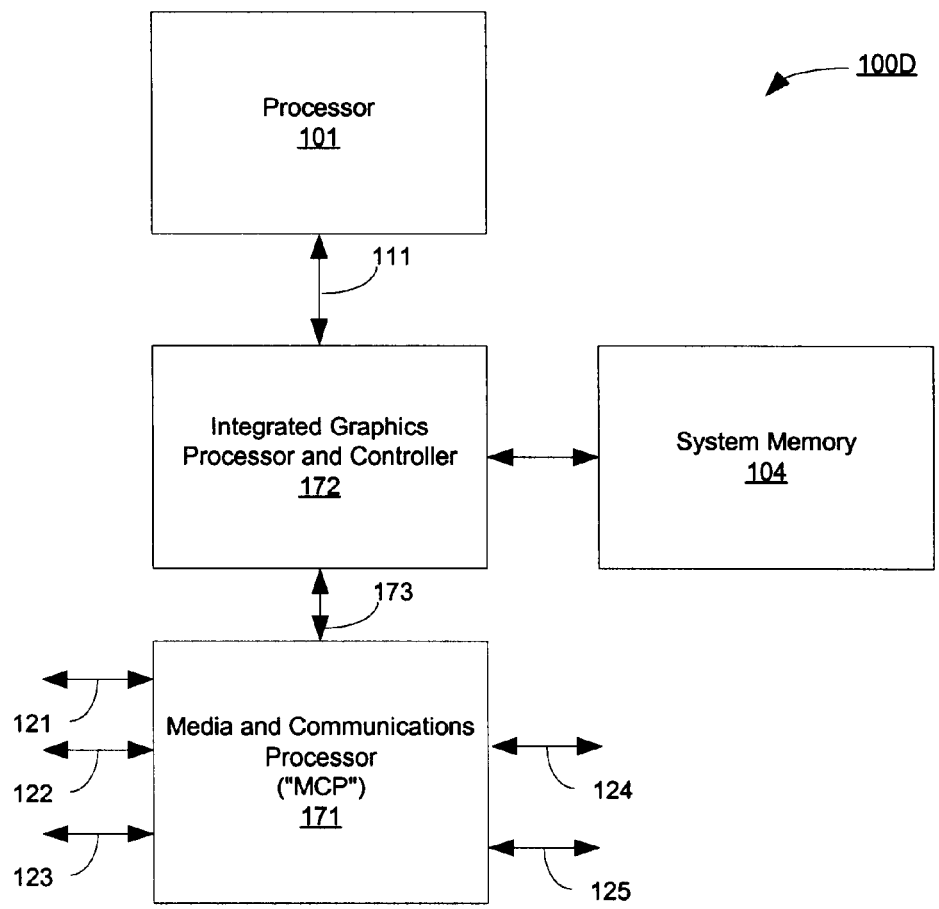

FIG. 1C is a block diagram of an exemplary embodiment of a computer system 100C in accordance with one or more aspects of the present invention. Computer system 100C of FIG. 1C is similar to computer system 100B of FIG. 1B, with some changes. Host controller 102B is replaced with system controller 102C, and I/O controller 103B is replaced with peripheral bus controller 103C. Another difference is that peripheral bus controller 103C is coupled to system memory via SMBus 121. Another difference is that a plurality of processors 101 are bused with system controller 102C via system buses 111C and with peripheral bus controller 103C via advanced programmable interrupt controller (APIC) bus 131. This architecture is a Northbridge/Southbridge architecture, where system controller 102C is a Northbridge chip and peripheral bus controller 103C is a Southbridge chip. Additional busses may be coupled in a known manner. The graphics controller 105 can be incorporated into the Northbridge chip. Alternatively, the host controller 102B and the I/O controller 103B can be on a single integrated circuit or single semiconductor platform. FIG. 1D is a block diagram of an exemplary embodiment of a computer system 100D in accordance with one or more aspects of the present invention. Processor 101 is coupled to integrated graphics processor and controller ("IGP") 172 via FSB 111. IGP 172 includes a graphics controller and is coupled to system memory 104, as well as to media and communications processor ("MCP") 171. MCP 171 is coupled to IGP 172 via a high-speed, point-to-point interconnect, such as a HyperTransport interface, 173. Other conventional busing may be coupled to MCP 171. A single integrated circuit die may be used to provide IGP 172, where IGP 172 comprises a medium access controller, a baseband processor and a medium access controller/baseband processor digital interface for communicating with a radio.

Figure 2A:
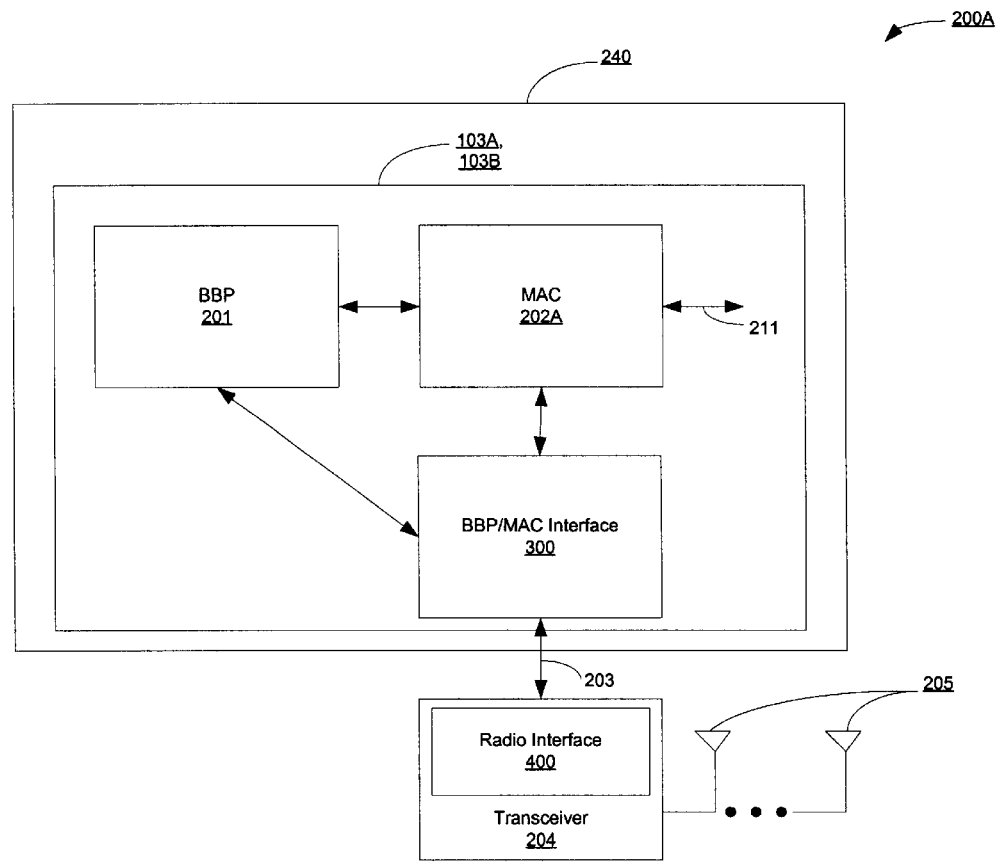
FIGS. 2A and 2B are block diagrams of exemplary embodiments of respective radio-baseband subsystems in accordance with one or more aspects of the present invention.

FIG. 2A is a block diagram of an exemplary embodiment of a radio-baseband subsystem 200A in accordance with one or more aspects of the preset invention Baseband subsystem 240 may be located on a system board ("mother board") 240. Transceiver 204 is coupled to at least one antenna 205. Transceiver 204 comprises radio interface 400 which is coupled to a BBP/MAC interface 300 via at least one bi-directional serial link or at least two unidirectional serial links 203. BBP/MAC interface 300 is coupled to BBP 201 and MAC 202. BBP 201 is coupled to MAC 202 in a conventional manner. BBP 201, MAC 202 and BBP/MAC interface 300 are formed on the same silicon with I/O controller 103A or 103B. In other words, BBP 201, MAC 202 and BBP/MAC interface 300 may be formed as part of the same integrated circuit as I/O controller 103A or 103B. MAC 202 may be coupled to a PCI bus, as described above. Alternatively, MAC 202 may be coupled to a fast PCI (FPCI) bus 211 in a manner as set forth in a media and communications processor (MCP) from Nvidia of Santa Clara, Calif.

Figure 2B:
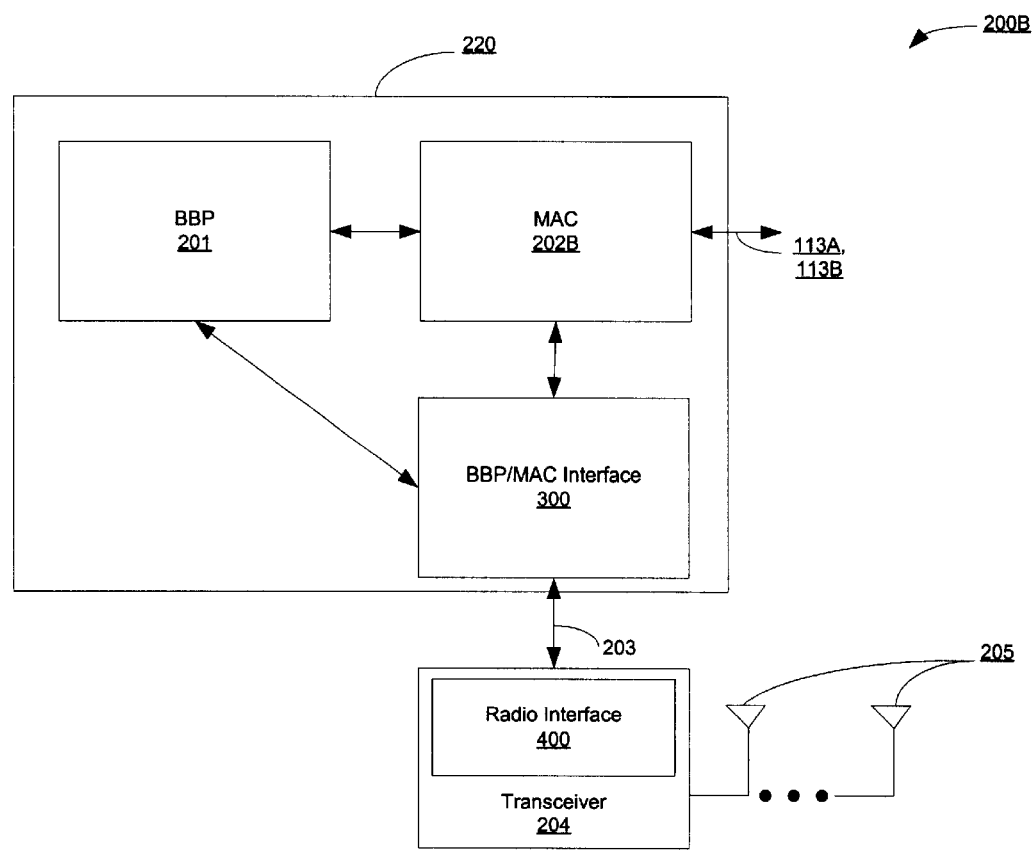

FIG. 2B is a block diagram of an exemplary embodiment of a radio-baseband subsystem 200B in accordance with one or more aspects of the present invention. Baseband subsystem 200B of FIG. 2B comprises some of the same circuitry as baseband subsystem 200A of FIG. 2A, except rather than formed as part of I/O controller 103A or 103B, MAC 202B, BBP 201, BBP/MAC interface 300 are separate from I/O controller 103A or 103B. BBP 201, MAC 202B and BBP/MAC interface 300 may be attached to a printed circuit board (PCB) such as PCB 220 as separate integrated circuits, or a single integrated circuit of all three but not part of I/O controller 103A and 103B. MAC 202B is coupled to a PCI controller via PCI bus 113A or 113B.

Figure 3:
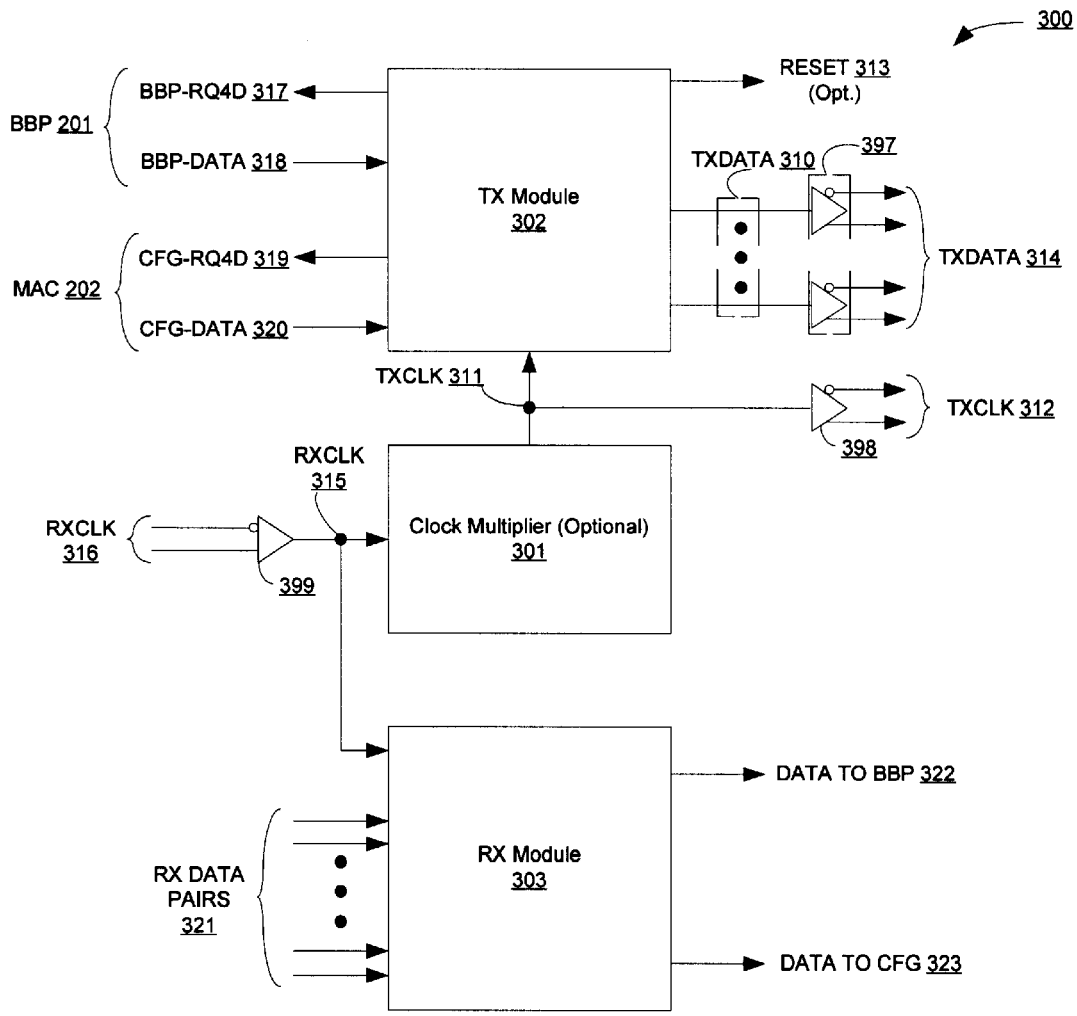
FIG. 3 is a high level schematic diagram of an exemplary embodiment of a BBP/MAC interface in accordance with one or more aspects of the present invention.

Referring to FIG. 3, there is shown a high level schematic diagram of an exemplary embodiment of a BBP/MAC interface 300 in accordance with one or more aspects of the present invention. Interface 300 comprises transceiver module 302, clock multiplier 301 and receiver module 303. Notably, clock multiplier 301 is optional if transceiver module 302 and receiver module 303 operate at the same frequency. A receive clock 316 is differentially inputted to differential amplifier 399 to provide receive clock 315. Receive clock 315 is provided to clock multiplier 301 and receive module 303. Clock multiplier 301 receives receive clock 315 and multiplies its frequency to provide transmit clock 311. Though transmit clock 311 may be at a same frequency as receive clock 315, it is contemplated that transceive clock 311 will be a multiple frequency of receive clock 315, such as approximately 2 to 20 times the frequency of receive clock 315. Transmit clock 311 is provided to differential amplifier 319 to provide differential output transmit clock 312. Transmit clock 311 is also provided to transmit module 302.

Figure 4:
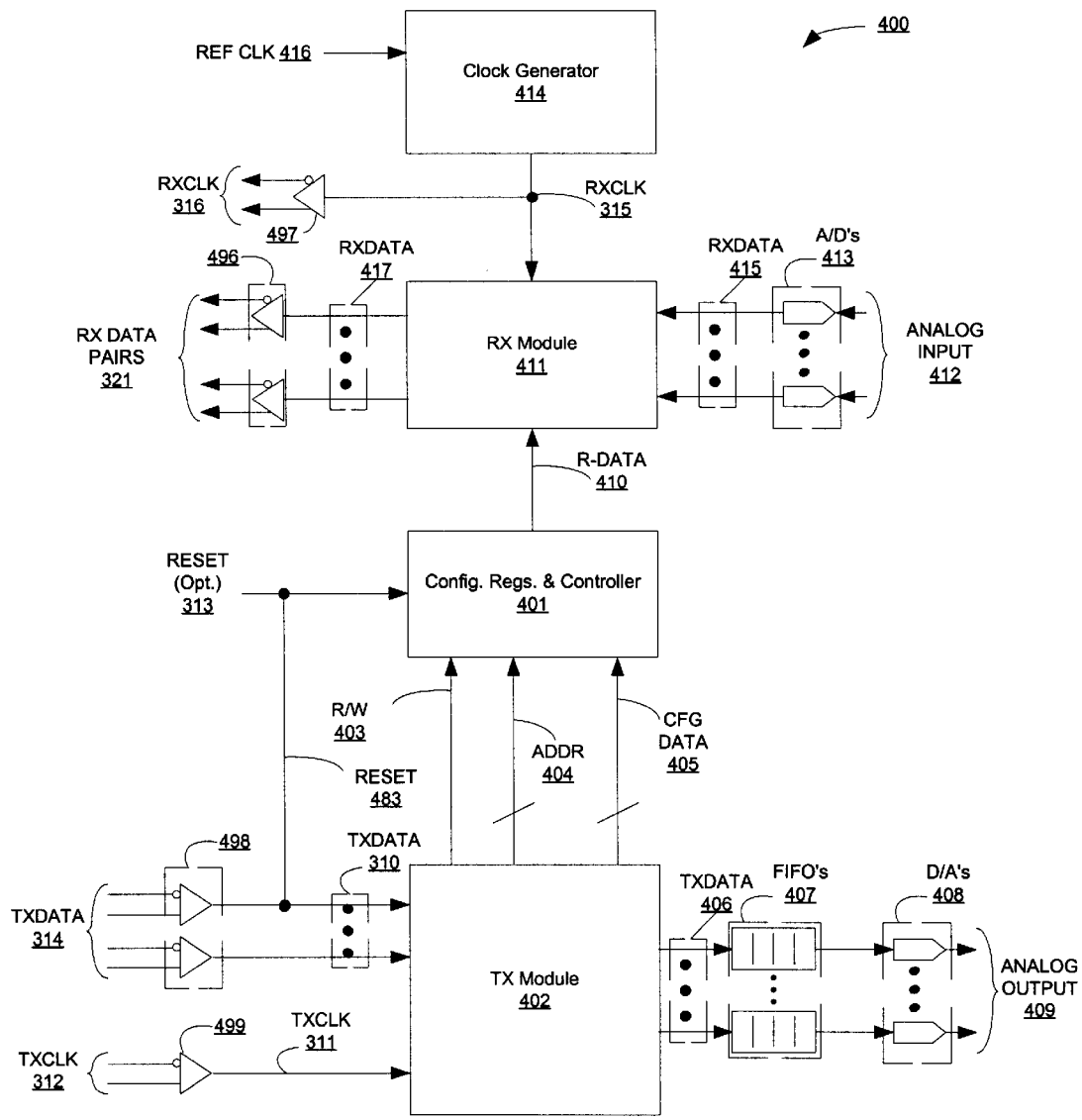
FIG. 4 is a high-level schematic diagram of an exemplary embodiment of transceiver (radio) interface in accordance with one or more aspects of the present invention.

FIG. 4 is a high level schematic diagram of an exemplary embodiment of transceiver (radio) interface 400 in accordance with one or more aspects of the present invention. Radio interface 400 comprises clock generator 414, receive module 411, configuration registers and controller 401 and transmit module 402. Transmit clock 312 is provided to differential amplifier 499 to provide transmit clock 311 to transmit module 402.

Figure 5:
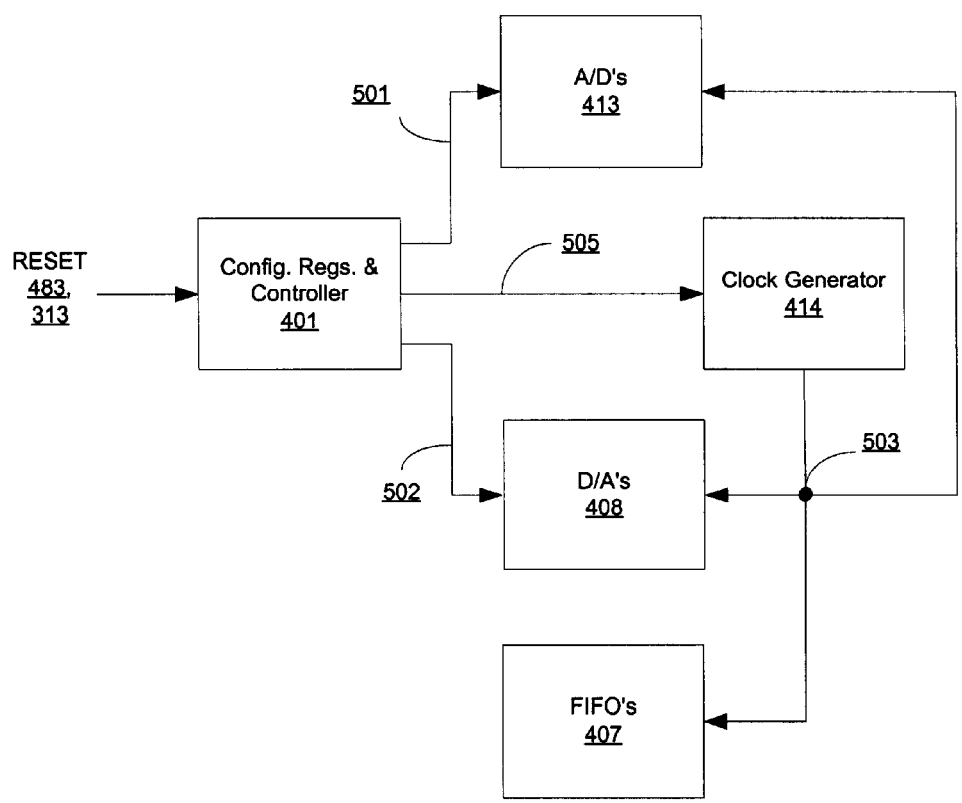
FIG. 5 is a block diagram of an exemplary embodiment of a portion of the radio-interface of FIG. 4.

FIG. 5 is a block diagram of a portion of radio-interface 400 of FIG. 4. Radio-interface 400 comprises configuration registers and controller 401, as well as analog-to-digital converters (A/D's) 413, digital-to-analog converters (D/A's) 408, first-in first-out buffers (FIFO's) 407, and clock generator 414.

Figure 6:
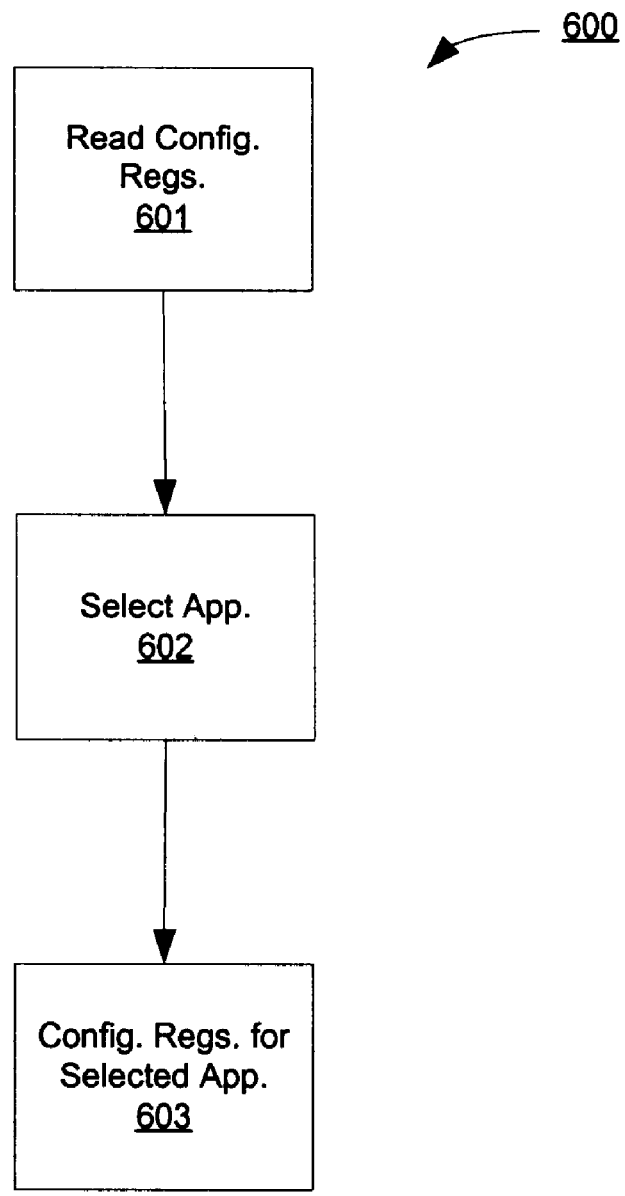
FIG. 6 is a block diagram of an exemplary embodiment of a protocol initialization process in accordance with one ore more aspects of the present invention.

Referring to FIG. 6, there is a shown a block diagram of an initialization process 600 in accordance with one ore more aspects of the present invention. At 601, configuration registers, such as configuration registers of configuration controller 401, of a radio, such as transceiver 204 are read. At 602 an application is selected. Examples of such applications include, but are not limited to, IEEE 802.11a, b, d, e, f, g, h and i. Such an application may be used to determine speed or frequency of operation of a transceiver, such as transceiver 204 of FIGS. 2A and 2B, as well as available primary and virtual channels, timing and data size parameters of such channels, and link data width. At 603, registers, such as registers of configuration controller 401, are configured for a selected application. Accordingly, configuration registers may include available length, width, speed of operation, and time and data size parameters of channels for transceiver 204 of FIGS. 2A and 2B.

With continuing reference to FIG. 6 and renewed referenced to FIGS. 3, 4 and 5, BBP/MAC interface 300 and radio interface 400 are further described. Process 600 may be invoked via MAC 202A, 202B ("MAC 202"). Transmit module 302 receives configuration data in response to configuration request signal 319 provided to MAC 202. As described with respect to process 600, MAC 202 obtains configuration data for a selected application for configuring transceiver 204. Notably, though storage of configuration information is described in terms of configuration registers, other storage means may be used for storing configuration information for transceiver 204 including, but not limited to, memory. MAC 202 provides configuration data via data signal 320 to receiver module 302.

Transceiver module 302 provides data, whether configuration data or data to be communicated ("over-the-air data") via transmit data signal 310 to differential amplifiers 397 to provide transmit data signals 314. Transmit data signals 314, at least during initialization, may comprise configuration data. Transmit data signals 314 received by differential amplifiers 498 provide transmit data signals 310 to transmit module 402. Transmit module 402 converts such transmit data signals 314 into a write control signal of read/write (R/W) control signal 403, as well as an address provided via address signal 404 and configuration data via configuration data signal 405.

In response to a selected application, speed of operation, as well as time and data size parameters for channels, is written to configuration registers of configuration controller 401 at specified addresses to provide the appropriate interface for such a selected application.

Configuration controller 401 provides control signals 501, 502, and 505. Control signal 501 is provided to A/D's 413 to select appropriate data channel width for analog input 412. Control signal 502 is provided to D/A's 408 to select an appropriate number of digital-to-analog converters for data channel width for analog data output 409. Control signal 505 is provided to clock generator 414 to provide a frequency of operation corresponding to an application selected. Notably, other control signals, not shown, from configuration controller 401 may be provided to disseminate other application-specific control information. Clock generator 414 provides clock signals 503 to D/A's 408A, A/D's 413 and FIFO's 407 so these circuits can be clocked at an appropriate frequency for a selected application.

Clock generator 414 receives a reference clock signal 415 from which to provide receive clock signal 315. Receive clock signal 315 is provided to differential amplifier 497 to provide receive clock signal 316 to differential amplifier 399.

For a transmit operation, transmit module 302 requests data from BBP 201 via BBP request for data signal 317. BBP 201 provides data via BBP data signal 318 to transmit module 302. Notably, transmit module 302 may optionally provide a reset signal 313 to configuration controller 401 to reset configuration controller 401 to default settings. Additionally, reset signal 313 may be used in connection with an enable bit written to configuration controller 401 as a master enable to enable a new setting of configuration registers 401. Alternatively, an "illegal" state may be used for reset. For example, both signals on a TXDATA 314 differential pair may be at a same logic level, such as both low or both high, to reset configuration registers and controller 401, for example via reset signal path 483 or with a control signal from TX module 402 to configuration registers and controller 401. Thus, TXDATA 310 may be used to set TX module 402 to reset configuration registers and controller 401. Moreover, an illegal state may be used to reset a clock.

Data requested from BBP 201 and received from BBP 201 to transmit module 302 is provided as transmit data signals 310 to differential amplifiers 397 to provide transmit data signals 314. Transmit data signals 314 are provided to differential amplifiers 498 to reconstitute transmit data signals 310 at transmit module 402 of radio interface 400. Transmit module 402 provides transmit data signals 310 as transmit data signals 406 to FIFO's 407 for buffering. Buffered data from FIFO's 407 is clocked out to D/A's 408 where it is converted from a digital format to an analog format to provide analog data output 409.

For a receive operation, analog input 412 is received to A/D's 413. A/D's 413 converts analog input 412 to digital input in the form of receive data signals 415. Receive data signals 415 are provided to received module 411 which outputs such received data in the form of receive data signals 417 to differential amplifiers 496. Differential amplifiers 496 convert received data in a digital format to a differential format as data pairs 321. Data pairs 321 are provided to receive module 303 of BBP/MAC interface 300. Receive module 303 provides such data as output to BBP 201 as data output 322.

Reset signal 313 may be provided from transmit module 302 to configuration controller 401 to read configuration capabilities of transceiver 204. Read configuration data is provided as data signal 410 to receive module 411 for outputting as receive data signals 417 to differential amplifiers 496. Differential amplifiers 496 convert configuration data which is represented as receive data signals 417 to receive data pair signals 321 which are provided to receive module 303 of BBP/MAC interface 300. Receive module 303 converts received data pairs signals 321 to configuration data signal 323 for providing to MAC 202. In this manner, transceiver 204 configuration capabilities may be assessed to determine what applications transceiver 204 can support.

Transceiver 204, at power-up, may operate off of default values, such as default values for data width and frequency of operation. Configuration registers 401 are written, for example to operate with a data width or frequency of operation greater than a default setting thereof, including writing a set enable bit. Once a reset signal is received, because an enable bit is set, configuration controller 401 configures transceiver 204 for a configuration written thereto. In this manner, transceiver 204 may initially run at a first frequency or a first data width after power-up, and be stepped up to a second frequency or a second data width for a selected application.

Figure 7A:
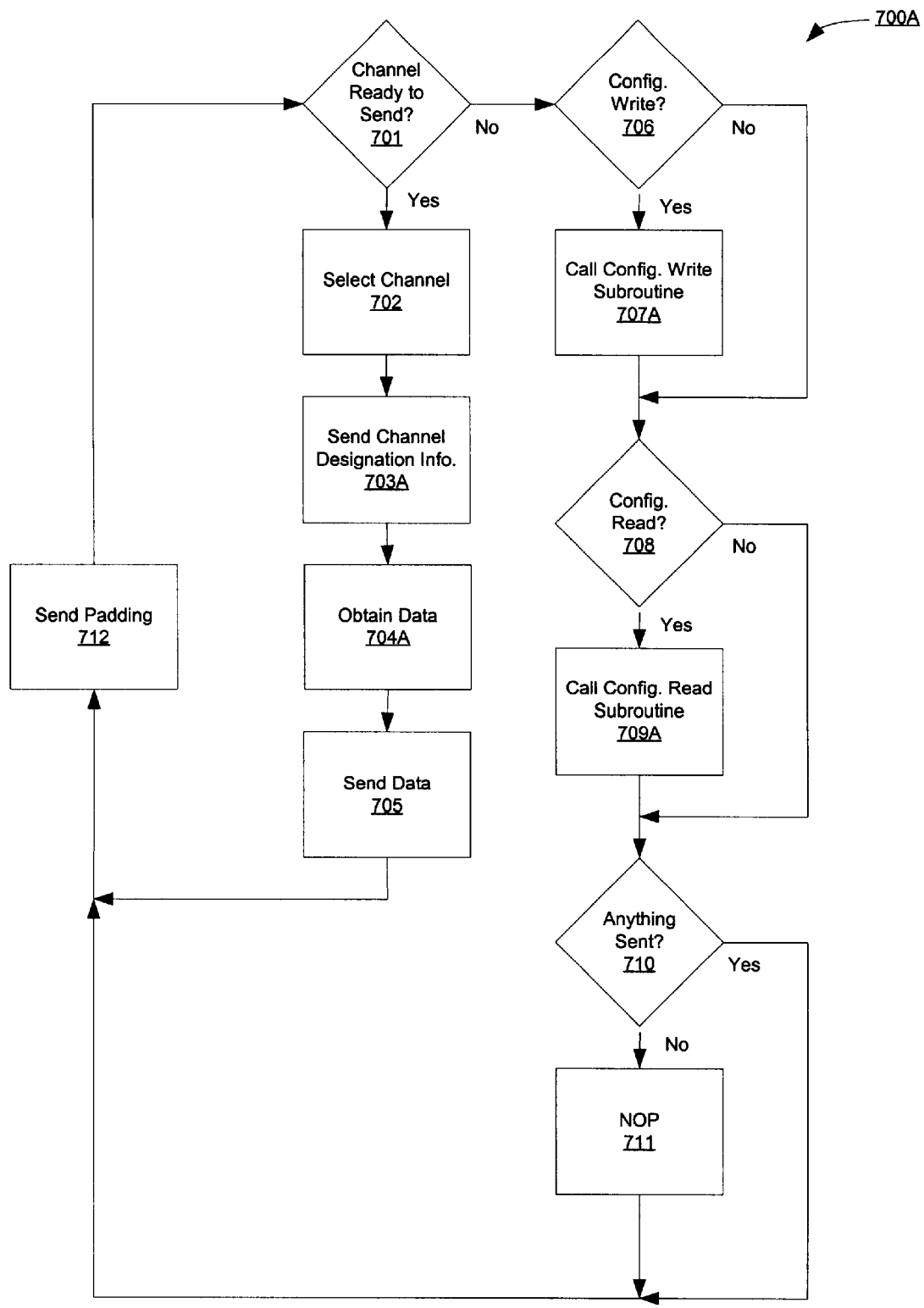
FIGS. 7A and 7B are flow diagrams of exemplary embodiments of protocol transmit processes in accordance with one or more aspects of the present invention.

Referring to FIG. 7A, there is shown a flow diagram of an exemplary embodiment of protocol transmit process 700A in accordance with one or more aspects of the present invention. For purposes of clarity, it will be assumed that there are 16 possible channels, where channel 0 and 1 are primary channels and the remaining channels, namely channels 2–15, are secondary channels.

At 701, a check is made to determine if a channel is ready to send. As mentioned above, a time parameter associated with when a channel should send is part of configuration of transceiver 204. Conventionally, a primary channel's need for bandwidth and total available bandwidth of a link dictated a strict time slice of such a link for secondary channel bandwidth. However, because primary channels or secondary channels may be configured, namely, they need not be fixed functions, an available bandwidth may be at least partially allocated for secondary channel communication. Furthermore, depending on configuration, an average guaranteed bandwidth may be made available for secondary channel communication. Thus, a channel is ready to send in accordance with configured timing. If a channel is in a ready state to send data or other information, or even no operation (NOP), a channel is selected at 702. At 703A, channel designation information associated with the selected channel is sent. At 704A data to be sent is obtained, and at 705 such obtained data is sent. Padding is sent at 712 on an as needed basis. This process repeats at 701 to determine whether another channel is in a ready state to send.

If at 701 a channel is not in a ready state to send, a check is made at 706 to determine if a configuration write is pending. If a configuration write is pending, a call to a configuration write routine is made at 707A. After such a call or if no configuration write is pending, a check is made at 708 to determine if a configuration read is pending. If a configuration read is pending at 708, then at 709A a call is made to a configuration read subroutine. If after a configuration is read after calling a configuration read subroutine at 709A or no configuration read is pending at 708, then a check is made at 710 to determine if anything was sent. If anything was sent process 700A begins again at determining whether a channel is ready to send at 701. If no information was sent then a NOP signal is provided at 711, and protocol transmit process 700A repeats at checking whether a channel is ready to send at 701.

Notably, when data is sent it will be sent with particular bit width as configured. For primary channels, a configurable bit width of N bits may be used. However, secondary channels may have a fixed bit width. A fixed bit width may be dictated by capability of transceiver 204 of FIGS. 2A and 2B. At step 712, padding, if any, is sent. A communication link has a configurable minimum packet size, which could be as small as one bit. A minimum packet size larger than one bit allows the use of a standard serializer/deserializer structure to let the TX and RX modules operate on several bits in parallel while still sending bits serially over the communication link thereby simplifying design. However, assuming that minimum packet size is two bits, then any packet transfer not an integer multiple of such a minimum packet size would automatically have padding, such as all ones or zeros, sent after such a packet until a packet is sent with a size that is a multiple of the minimum packet size. Sending of all ones or zeros after a packet less than a minimum packet size applies to all transfers, whether primary, secondary, configuration or NOP, in both transmit and receive directions.

Figure 7B:
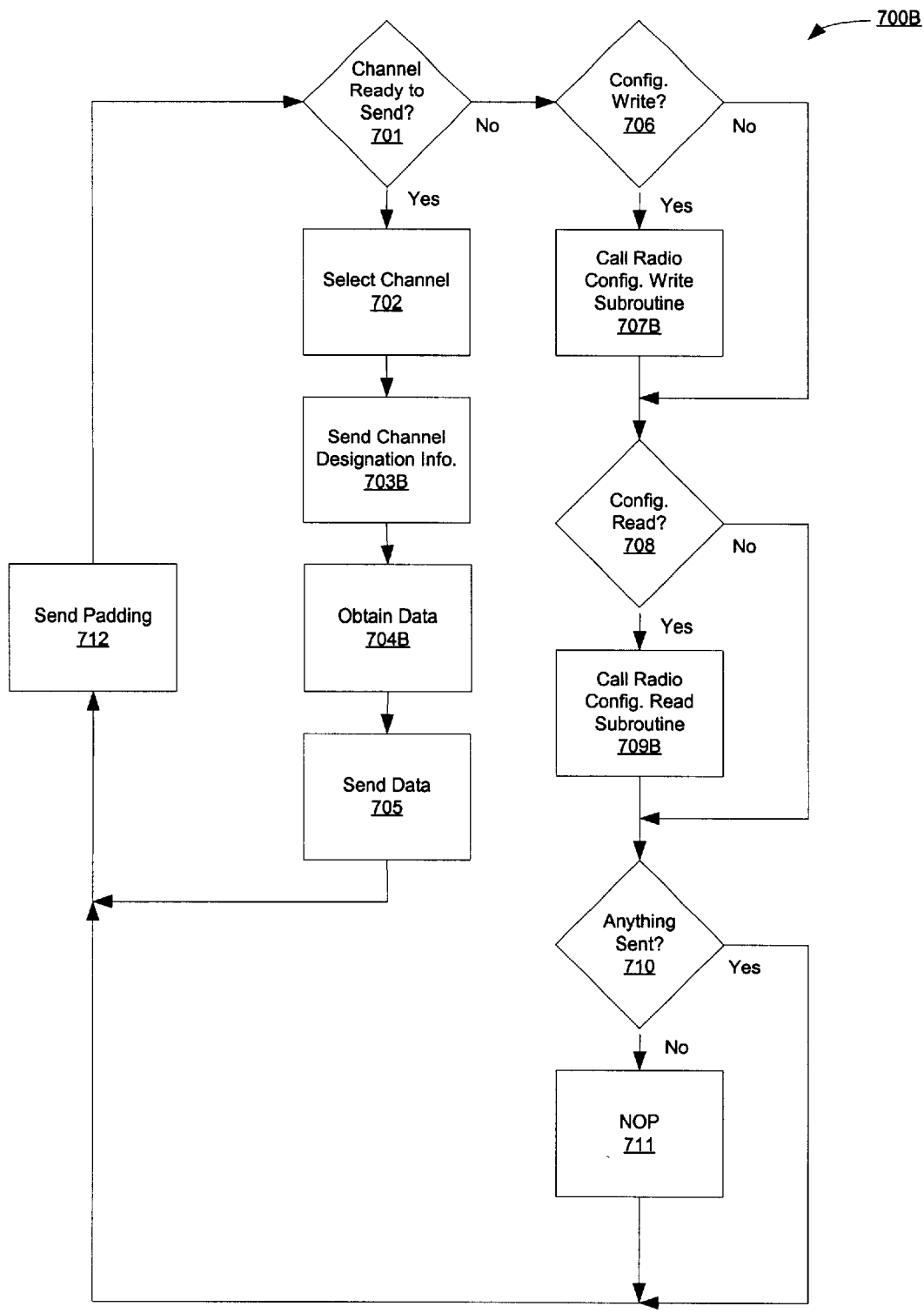

FIG. 7B, where there is shown a flow diagram of an exemplary embodiment of protocol transmit process 700B in accordance with one or more aspects of the present invention, is similar to protocol transmit process 700A of FIG. 7A. However, where protocol transmit process 700A is for a BBP/MAC side, protocol transmit process 700B is for a radio side. Thus, send channel designation information 703A and 703B and obtain data 704A and 704B are for different sides of BBP/MAC to radio digital interface. Furthermore calls to configuration write and read subroutines are made to radio configuration write and read subroutines 707B and 709B, respectively.

Figure 8A:
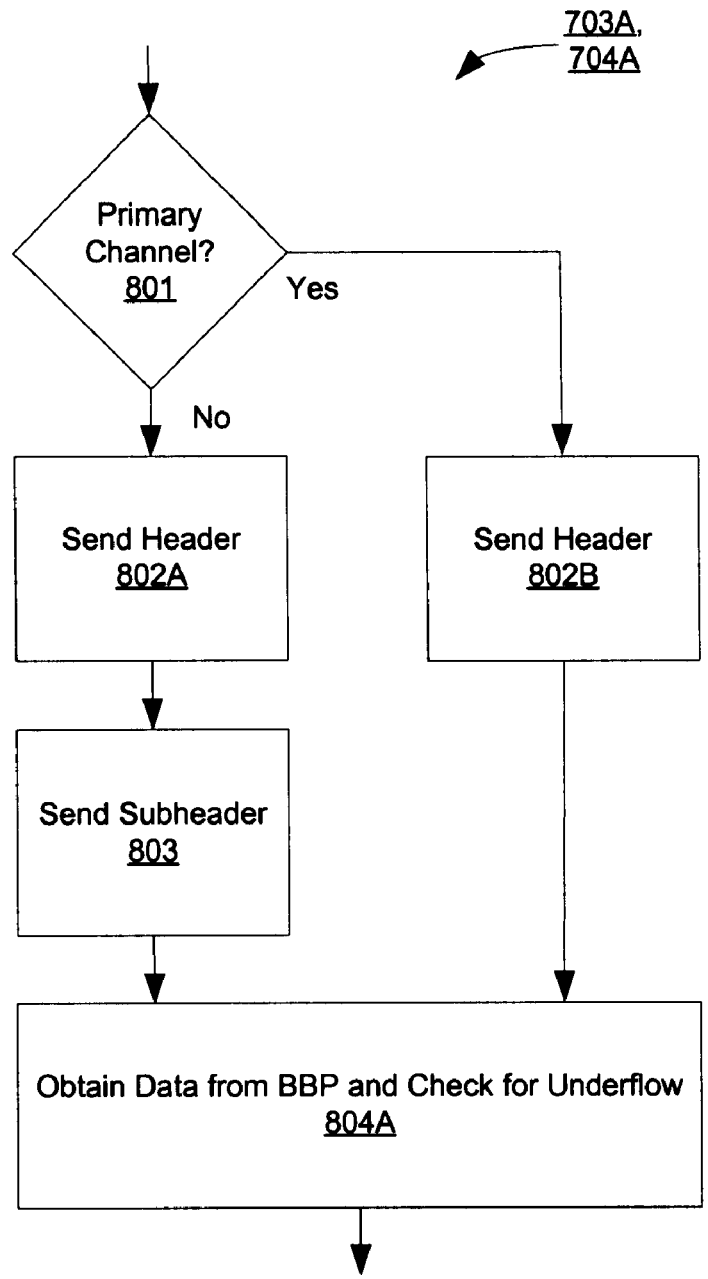
FIGS. 8A and 8B are flow diagrams of exemplary embodiments of respective portions of protocol transmit processes of FIGS. 7A and 7B in accordance with one or more aspects of the present invention.

As mentioned above, there are primary and secondary channels. FIG. 8A is a more detailed flow diagram of an exemplary embodiment of a portion of transmit protocol 700A of FIG. 7A in accordance with one or more aspects of the present invention. At 801, a check is made to determine if a selected channel such as at 702, is a primary channel. If such a selected channel is a primary channel, then at 802B a header for such a primary channel is sent. If, however, such a channel selected is not a primary channel, then a header is sent at 802A and a sub-header is sent at 803. For example, a header for primary channel in the above example of 16 channels, may be a two bit header, namely, a binary 10 or a binary 01. If, however, a secondary channel is selected at 801, such a header may be a binary 11 and a sub-header would be a 4 bit header to identify which of secondary channels 2–15 has been selected. At 804A data is obtained as it was at 704A FIG. 7A, from baseband processor 201. Optionally, at 804A an underflow check may be made to determine whether there is a lack of data on BBP-DATA signal 318. Notably, by differentiating between primary and secondary channels with a limited number of bits, bandwidth is conserved as channel designation information for primary channel communication is limited.

Figure 8B:
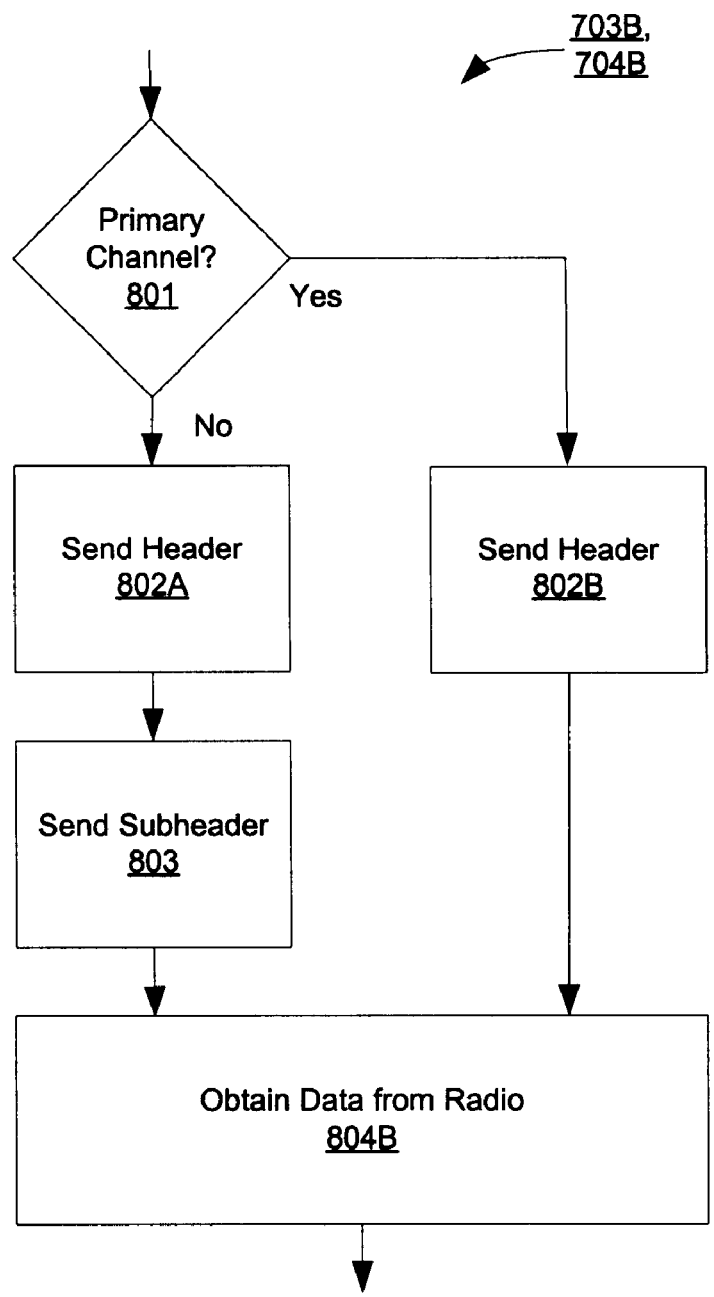

FIG. 8B is a more detailed flow diagram of an exemplary embodiment of a portion of transmit protocol 700B of FIG. 7B in accordance with one or more aspects of the present invention. Where FIG. 8A is for a BBP/MAC side, FIG. 8B is for a radio side of a BBP/MAC-to-radio digital interface. In FIG. 8B, at 804B, data is obtained from a radio, though no underflow check is done; otherwise, FIGS. 8A and 8B are the same. Hence, portions 703A and 704A of transmit protocol 700A are respectively similar to portions 703B and 704B of transmit protocol 700B.

FIG. 9A is a flow diagram of an exemplary embodiment of a configuration write subroutine 900A in accordance with one or more aspects of the present invention. At 903 a check is made as to whether it is allowed to do a configuration write. This is because there is only limited times within which to do a configuration write, or for that matter, a configuration read due to over-the-air data bandwidth consumption. If that time window expires such a configuration write or read will have to wait until another time window arises. If it is not allowed to do a configuration write, then subroutine 900 returns to 707A. If however it is allowed to do a configuration write, then channel designation information for such a configuration write is sent. Such channel designation information may include a header, such as for a primary channel, and such channel designation information may include a header and a sub-header such as for a secondary channel. At 905A, an address to be written to is obtained from MAC 202. At 906, such an obtained address is sent over a communication link. At 907A, data stored in association with such an address is obtained from MAC 202. At 908, such configuration data obtained is sent over a communication link. Padding may be added/sent at 909 to fill to a minimum packet size. After which, subroutine 900 returns to 707A.

FIG. 9B is a flow diagram of an exemplary embodiment of a configuration write subroutine 900B in accordance with one or more aspects of the present invention. Where FIG. 9A is for a BBP/MAC side, FIG. 9B is for a radio side of a BBP/MAC-to-radio digital interface. Subroutine 900B is similar to subroutine 900A, except rather than accessing address and data from MAC 202, a register address is obtained from configuration registers 401 at 905B and data associated with such a register address is obtained from configuration registers 401 at 907B.

Figure 10A:
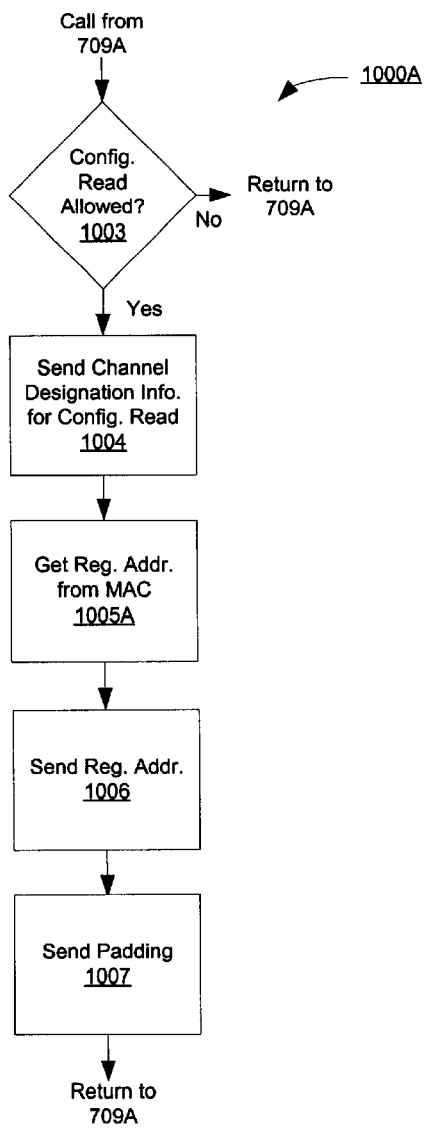
FIGS. 10A and 10B are flow diagrams of exemplary embodiments of configuration read subroutines in accordance with one or more aspects of the present invention.

FIG. 10A is a flow diagram of an exemplary embodiment of a configuration read subroutine 1000A in accordance with one more aspects of the present invention. At 1003 a check is made to determine whether is it allowed to do a configuration read. As mentioned above, a timing window must be open in which to do a configuration read so as not to interfere with bandwidth limitations due to communication over a link. If such a time window has expired in which to do a configuration read, subroutine 1000A returns to 709A. If however it is allowed to do a configuration read, then at 1004 channel designation information for a configuration read is sent. Such channel designation information includes a header and a sub-header. At 1005A, register address information from configuration registers is obtained. At 1006 such configuration register address information is sent. Padding may be added/sent at 1007 to fill to a minimum packet size. After which subroutine 1000A returns to 709A.

Figure 10B:
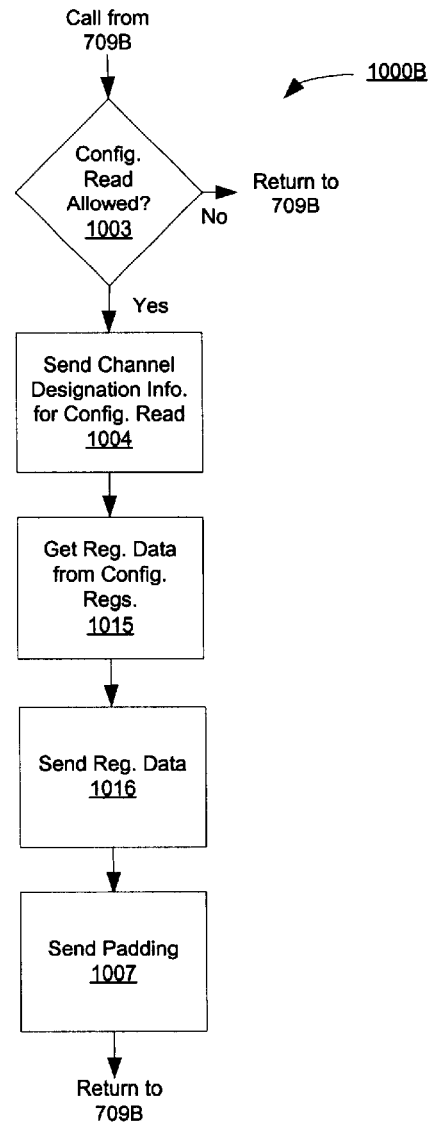

FIG. 10B is a flow diagram of an exemplary embodiment of a configuration read subroutine 1000B in accordance with one more aspects of the present invention. Where FIG. 10A is for a BBP/MAC side, FIG. 10B is for a radio side of a BBP/MAC-to-radio digital interface. Configuration read subroutine 1000B is similar to configuration read subroutine 1000A. However, at 1005B register address information is obtained from configuration registers 401. Furthermore, If a time window has expired in which to do a configuration read or after any send padding at 1007, subroutine 1000B returns to 709B.

It should be appreciated that multiples of reads or writes or any combination thereof may be done within an available time window for configuration reading or writing. Furthermore, it should be appreciated that at 1006 an address was sent for possibly subsequently calling configuration registers.

It should be further appreciated that because a ready state for sending for a channel is checked, secondary channels arbitrate for bandwidth, namely, use of bandwidth if available and a channel ready to send. Alternatively, a ready state for sending by a secondary channel may be done on a time slice basis, namely, each secondary channel gets an opportunity to send every so often.

Figure 11A:
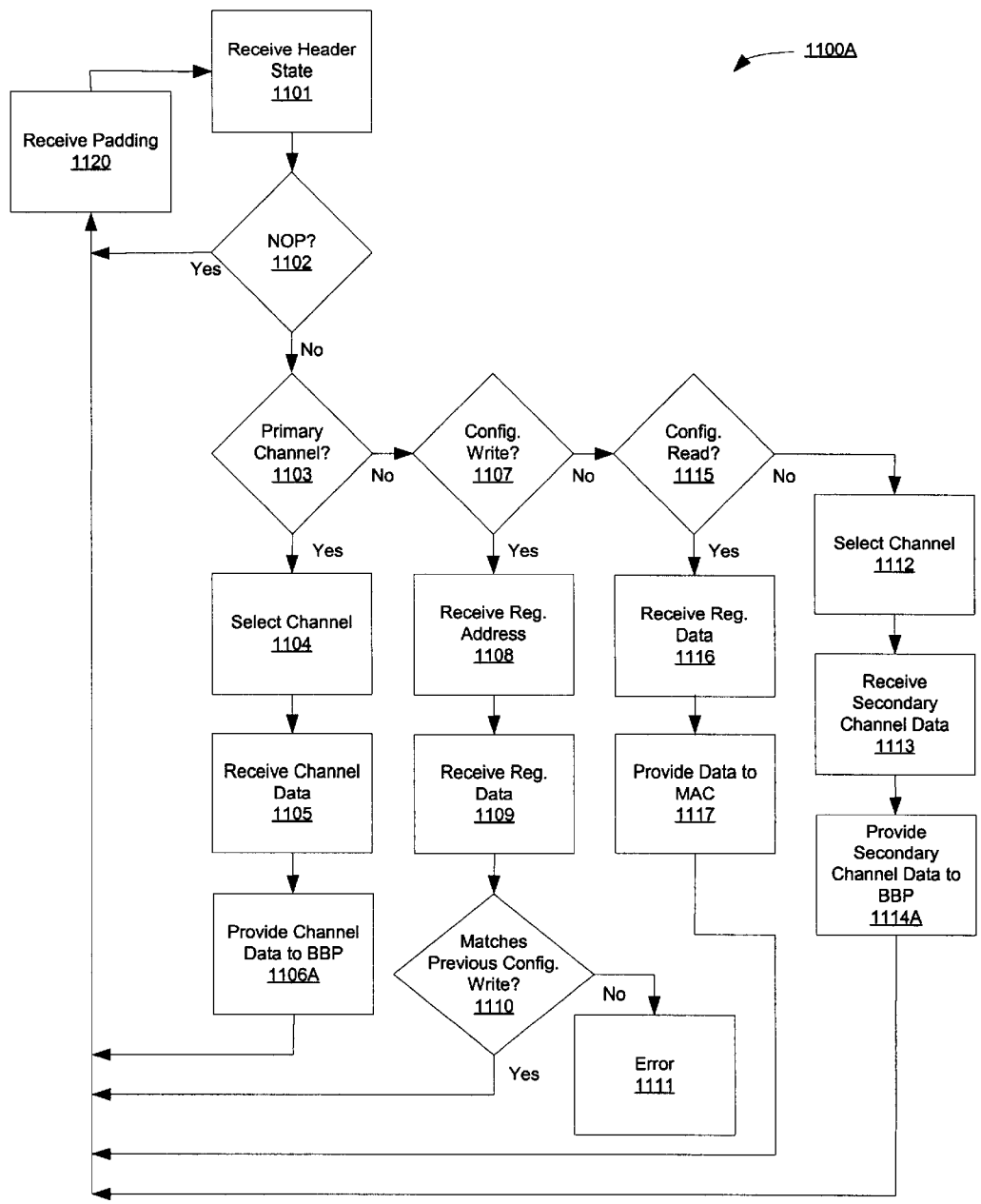
FIGS. 11A and 11B are flow diagrams of exemplary embodiments of protocol receive processes in accordance with one or more aspects of the present invention.

FIG. 11A is a flow diagram of an exemplary embodiment of a protocol receive process 1100A in accordance with one or more aspects of the present invention. At 1101, a header is received. Continuing the above example, such a header may be a binary 10, 11 or 01. Headers of binary 10 and 01 are for primary channels, and a header of a binary 11 is for a secondary channel. At 1102, a check for a NOP is made. A NOP may be indicated by a header of a binary 00 in the above example. If a NOP is detected at 1102, protocol receive process 1100A receives any padding at 1120 and then returns to receive header information at 1101. If, however, there is no NOP at 1102, then a check is made 1103 to determine whether or not such a received header is for a primary channel. If such a received header is for a primary channel, then such a primary channel is selected at 1104. Continuing the above example, if a binary 10 or 11 header is received, then the selected channel would be channel 0 or channel 1, respectively.

At 1105, channel data is received in a predetermined width for a selected channel is obtained. Channel width is obtained by MAC/BBP query of configuration registers associated with the radio, and the result from such query is stored. At 1106A, data received is provided to BBP 201.

Figure 11B:
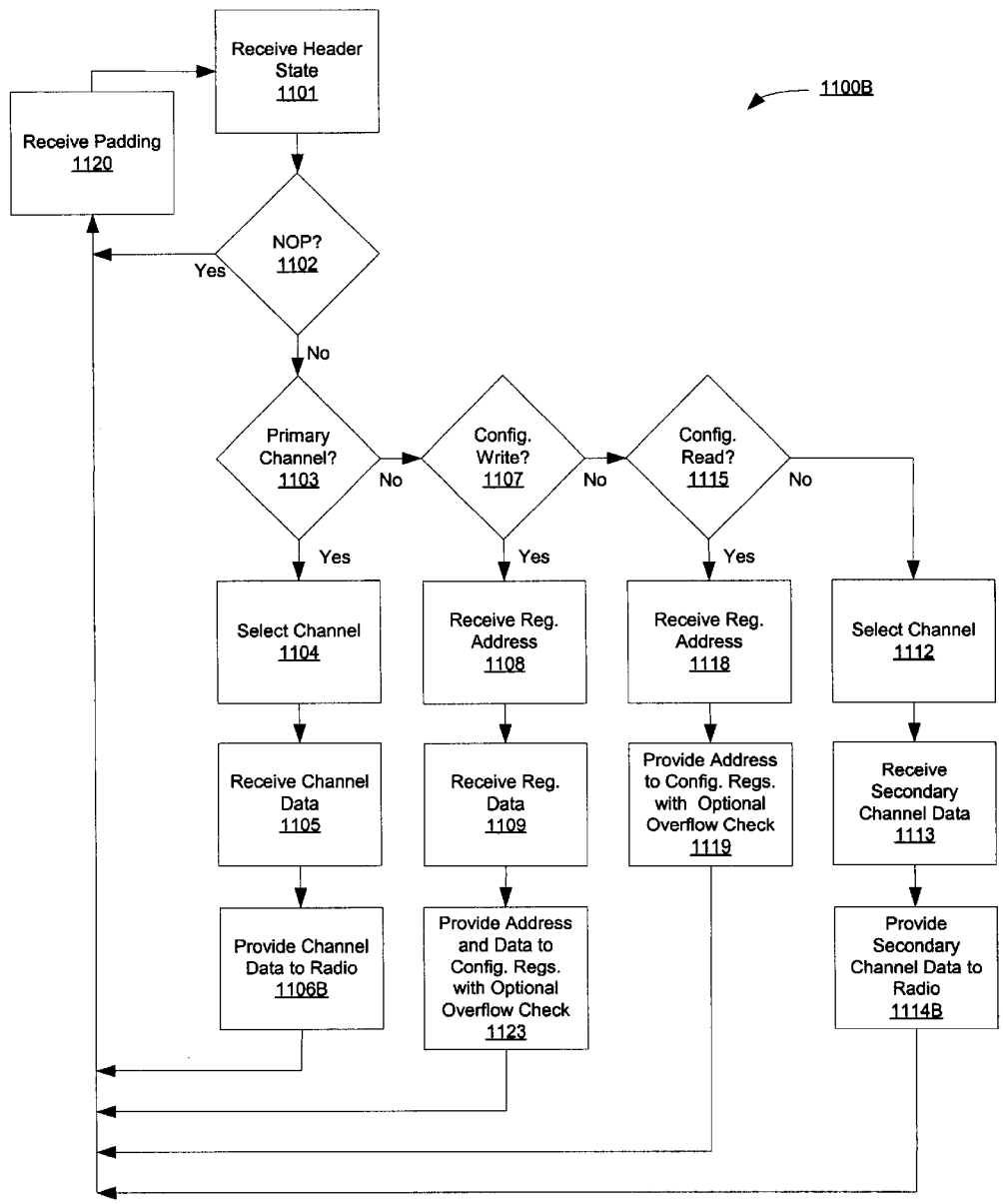

FIG. 11B is a flow diagram of an exemplary embodiment of a protocol receive process 1100B in accordance with one or more aspects of the present invention. Where FIG. 11A is for a BBP/MAC side, FIG. 11B is for a radio side of a BBP/MAC-to-radio digital interface. At 1106B, data received is provided to transceiver 204; otherwise to this point in the description, protocol receive processes 1100A and 1100B are the same.

If a primary channel is not indicated at 1103, a sub-header is checked at 1107. A sub-header may indicate a configuration write, or a selected secondary channel. For example, at 1107 a check may be made to determine whether a sub-header is for a configuration write.

If at 1107 a configuration write is indicated, then at 1108 a register address for such a configuration write is received. Continuing the above example, such a sub-header may be a binary 0 to indicate a configuration write, where a fixed bit width of 8 bits may be used for accessing a byte of information for a configuration register. At 1109, configuration register data is received for the received address at 1108.

With respect to protocol receive process 1100A, at 1110, a check is made to determine whether the configuration register address and data received at 1108 and 1109, respectively, matches a previous configuration write. If it does not match then an error results at 1111, and if it does match then any padding is received at 1120.

With respect to protocol receive process 1100B, configuration address information and data received at 1108 and 1109, respectively, is provided to configuration registers 401 at 1123. After which, any padding is received at 1120. In addition to providing configuration address information and data at 1123, an optional overflow check of FIFOs 407 may be made.

If however a configuration write is not indicated by a received sub-header at 1107, then a check may be made to determine if a configuration read was indicated at 1115. If a configuration read was indicated at 1115, then with respect to protocol receive process 1100A data for such a configuration read is received at 1116. At 1117, such received data is provided to MAC 202. After which, any padding is received at 1120.

If a configuration read was indicated at 1115, then with respect to protocol receive process 1100B an address for such a configuration read is received at 1118. At 1119, such a received address is provided to configuration registers 401. In addition to providing configuration address information at 1119, an optional overflow check of FIFOs 407 may be made. After which, any padding is received at 1120.

If a received sub-header does not indicate a configuration read or a configuration write, then a channel is selected at 1112 in response to such a received sub-header. As indicated above, such a received sub-header is 4 bits wide in order to delineate between channels 2 to 15 at 1112, where sub-header values 0 and 1, as mentioned above, indicate configuration write and configuration read status, respectively.

At 1113, secondary channel data is received. This may be an N bit wide channel in the above example, where bit width is predetermined for secondary channels too.

With respect to FIG. 11A, at 1114A, received secondary channel data is provided to BBP 201 of FIGS. 2A and 2B. Optionally at 1114A, an overflow check of FIFO's 407 of FIG. 4 can be made. After 1114A, receive protocol 1100A returns to receive header state 1101 after receiving any padding at 1120.

With respect to FIG. 11B, at 1114B, received secondary channel data is provided to transceiver 204 of FIGS. 2A and 2B. Optionally at 1114B, an overflow check of FIFO's 407 of FIG. 4 can be made. After 1114B, receive protocol 1100B returns to receive header state 1101 after receiving any padding at 1120.

A signaling protocol over a high-speed source-synchronous digital connection that supports wireless radio or any other application that sources and sinks data from one or more different logical streams at regular intervals has been described. Such a signaling protocol supports 802.11b with a single data wire or differential pair in each direction. This may be done while keeping link frequency low enough that it can operate in a wire-bond package, and while keeping semiconductor die size within a conventional package size. Supports for variable bus widths and link frequencies may be used to advertise capabilities of a radio and then program at least one of data width and speed. Additionally, at least two primary data streams and fourteen secondary data streams are supported. Bandwidth of each stream is described via configuration registers. Configuration access means includes support for additional vendor-specific registers.

Programmability of width/frequency of a link, for one or two primary data streams, uses a small transfer size to limit buffering on each end. A data stream model supports not only IEEE 802.11 application but other fixed-bandwidth modulator/demodulator applications. Primary and secondary channels are not fixed functions due to configuration writes for a selected application. Thus, different radios may be configured to use the same application, or different applications.

JC 61 RF/BB Proposal

Figures 1, 12:
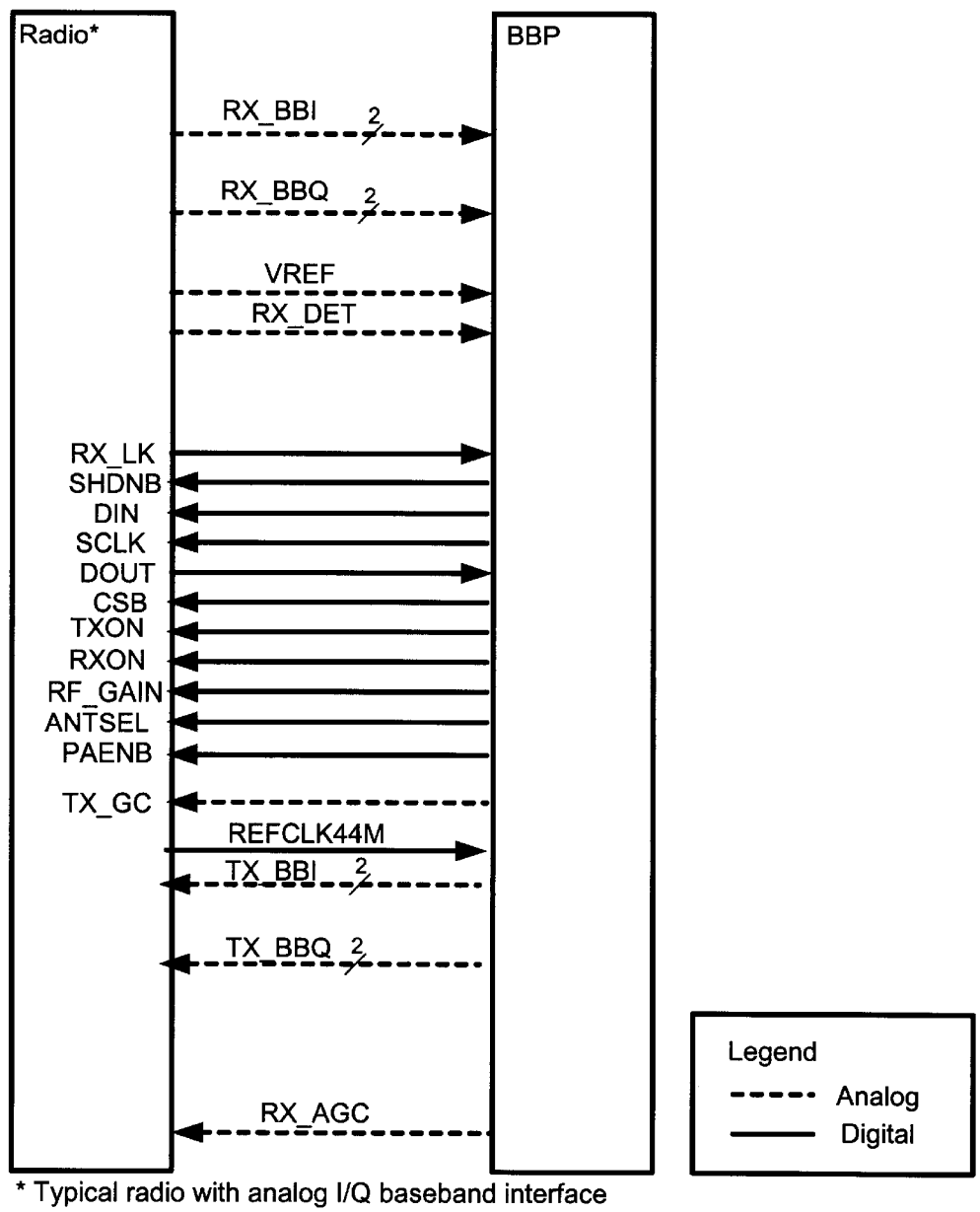
Figures 2, 12:
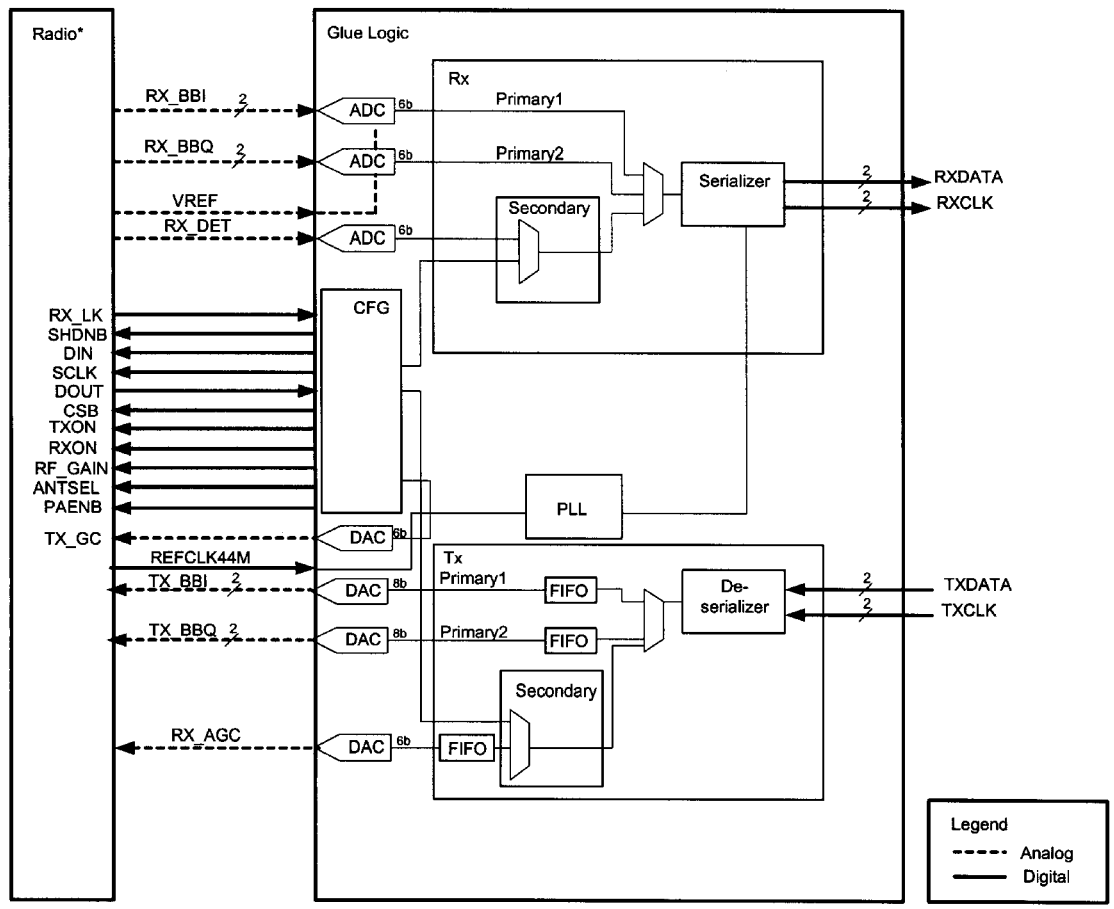
Figures 3, 12:
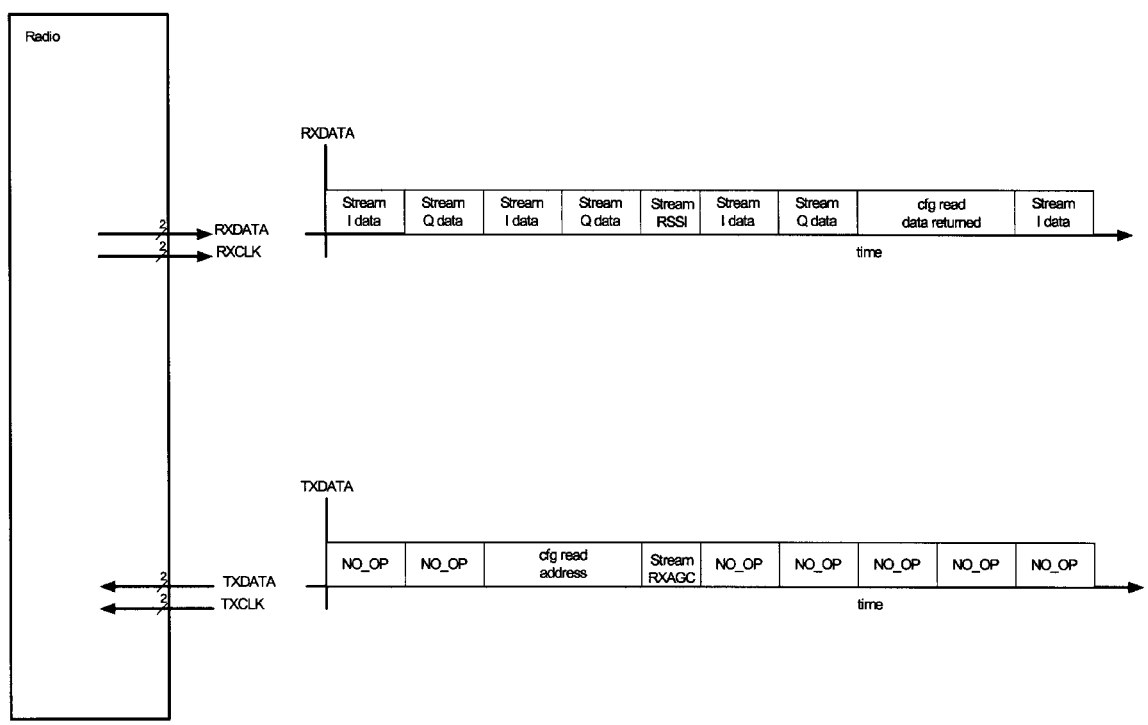
Figures 4, 12:
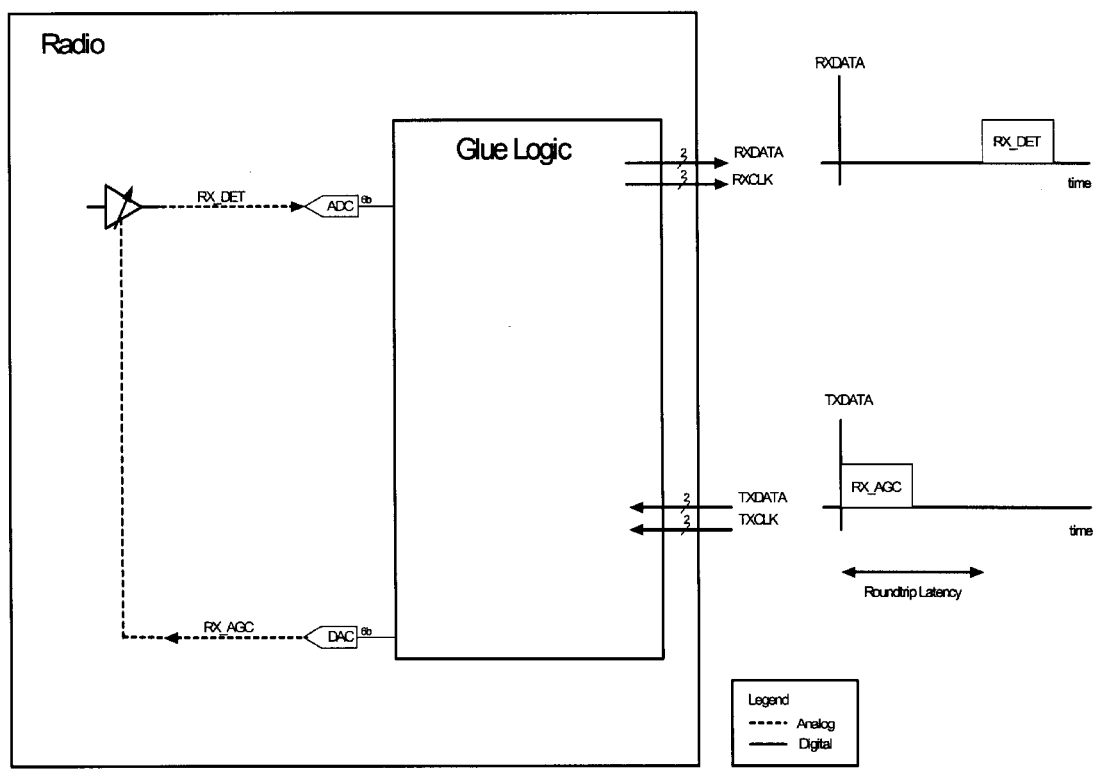
Figures 5, 12:
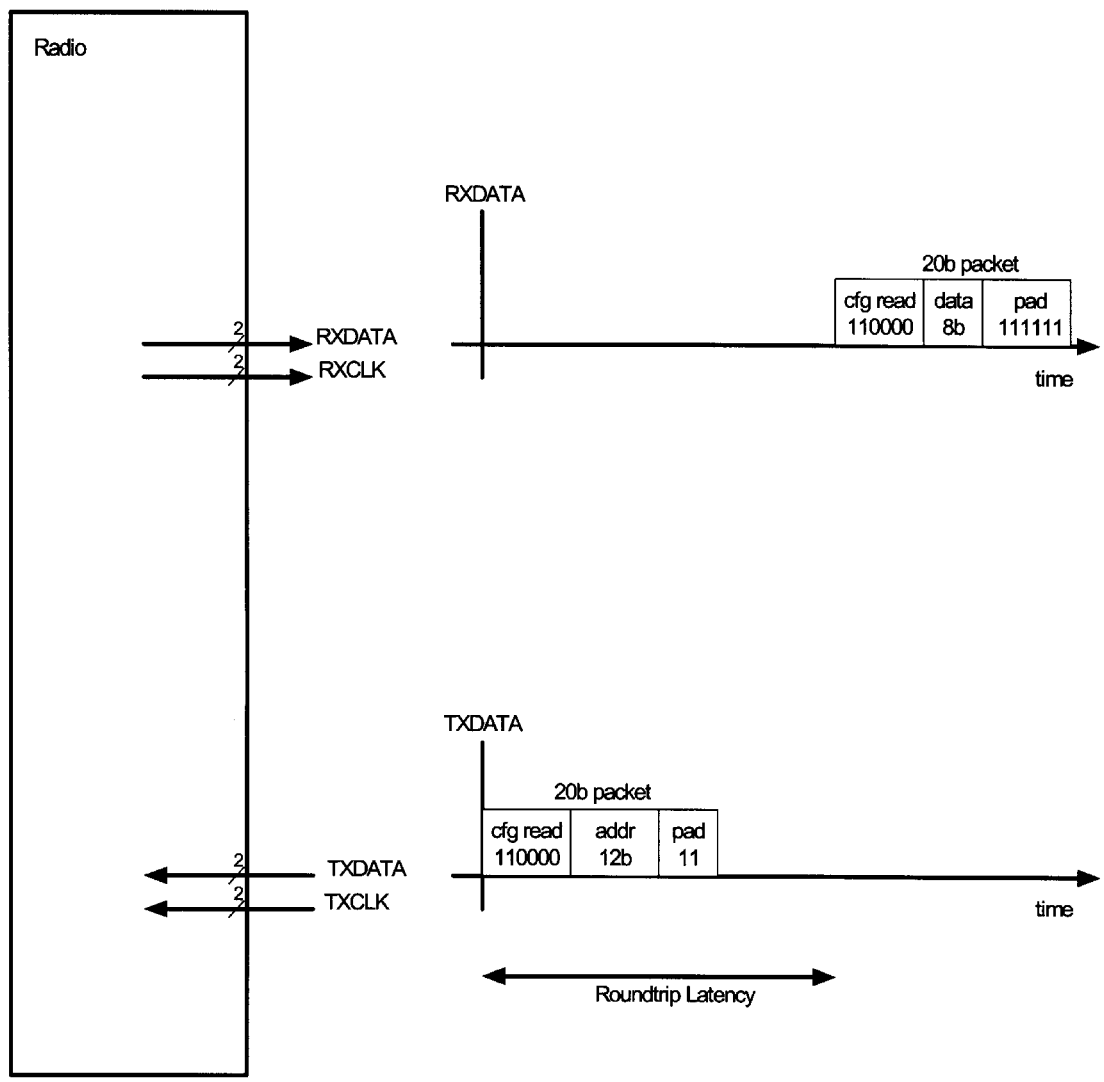
Figures 6, 12:
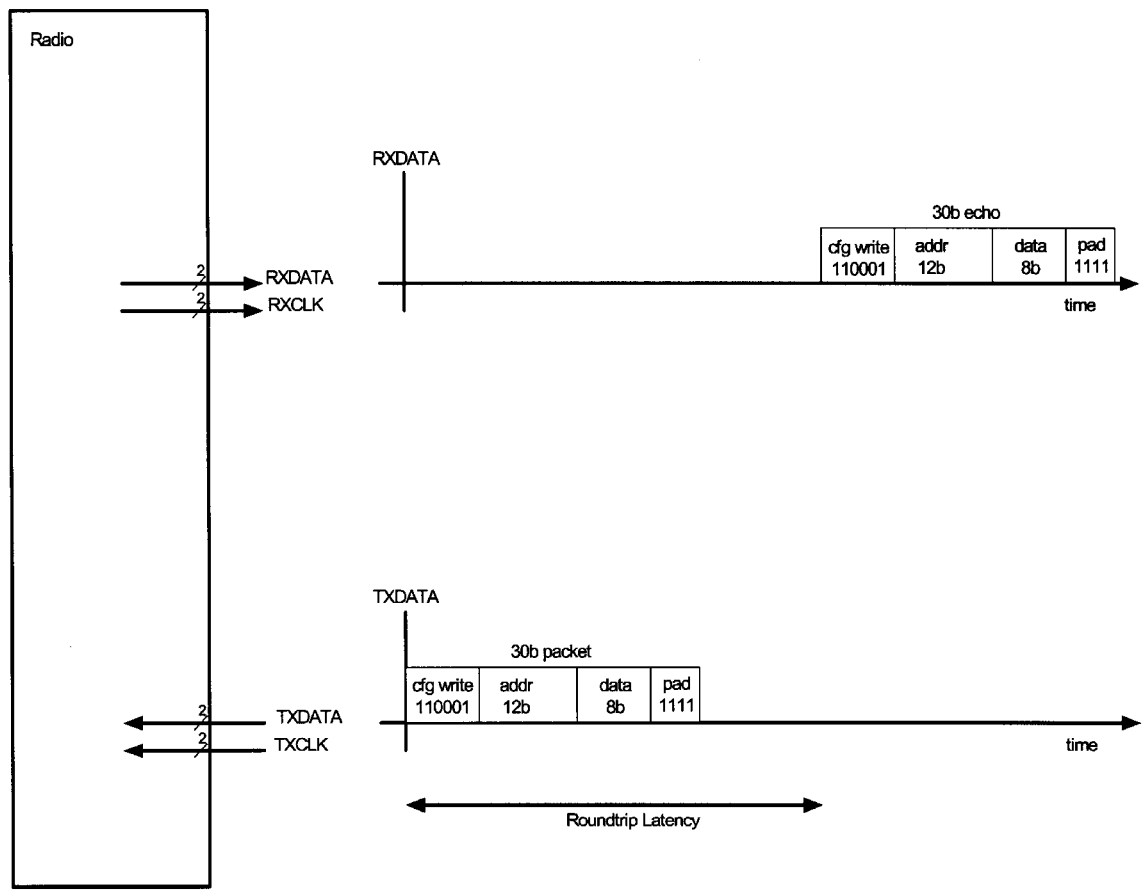

Conventionally, a radio is interfaced to a baseband using an analog I/O interface as shown in FIG. 12-1. A drawback of this approach is the large number of interface pins, as well as a need for careful routing of sensitive analog signals on the motherboard. For many applications it is desirable to use a digital interface instead. As shown in FIG. 12-2, a digital glue logic section converts analog signals to the digital domain, serializes resultant digital signals, and then sends out the serialized digital signals using high speed differential signaling. The serialized data uses only 8 pins compared to 24 pins in the analog interface in FIG. 12-1.

Because most of the existing radios use an analog I/Q interface, a digital link design that has enough flexibility to support existing and future radios is desirable. By adding a glue logic section, an ordinary radio with analog I/Q interface can be converted to one with a digital interface. The subsequent section describes the data organization, packet definition, and the electrical characteristics of this digital link.

Between the radio and the baseband modem, there are two major data types that are supported by the proposed high speed serial data link. The packet structure is specifically designed to handle these data types and permit efficient packet transmission and decoding. The simplest data type, the configuration data cfg, supports data transfer that is slow and infrequent. The other data type, the stream data, supports data transfers that are periodic such as baseband IQ data. There are different kinds of stream data such as I channel, Q channel, and RSSI data. During normal operation, the two types of data packets can be mixed. For example in FIG. 12-3, most of the packets are stream data such as baseband IQ or RSSI, where some cfg packets are inserted in between occasionally to handle cfg traffic. At the receiving end, the stream data packets are sorted through separate logical channels and into FIFO's from which the stream data can be consumed at a fixed rate. As long as the data generation rate matches the data consumption rate, there will be no FIFO overflow or underflow. In addition, the overall link bandwidth must be higher than the data consumption bandwidth plus overhead. As such, the overall link frequency can be set to a value by the radio to avoid interference to the RF circuits as long as it is higher than the required bandwidth.

A motivation for the stream data type is that many existing radios require hardwired signals from the baseband. For example, hardwired signals include all analog signals, along with some digital control bits that require low latency such as Rx signal detector or digital Rx AGC control. For these hardwired signals, it is important to be able to transfer the data at a specific rate with as low latency as possible. This link supports four types of stream data including (0) SYNC/NO_OP, (1) PRIMARY_Q, (2) PRIMARY_I, and (3) SECONDARY. The type is represented by the first two bits on the packet header. The number of bits within the payload can differ between data type and is set by the radio.

Table I is an example of one possible packet structure for headers.

TABLE I

| Header 2 b | | Payload |
| --- | --- | --- |
| 0 | 0 | SYNC or NO_OP |
| 0 | 1 | PRIMARY_Q |
| 1 | 0 | PRIMARY_I |
| 1 | 1 | SECONDARY |

The PRIMARY_I supports the I channel traffic, while the PRIMARY_Q supports the Q channel traffic. The speed and width of the channel is set by the radio in the cfg table below. In the implementation of the link, a FIFO and serializer and deserializers are needed. Therefore, there is latency between the sending of the data and the receiving of the data at the other end. However, the latency on the PRIMARY I/Q channels is usually not important.

The SECONDARY stream data supports the auxiliary converters such as RSSI and RxAGC. There are 11 channels available. The speed and the number of bits for each stream data is specified by the radio in a setup configuration table below.

Table I is an example of one possible packet structure for headers and subheaders.

TABLE II

| Header 2 b | | Subheader | Payload defined by radio |
| --- | --- | --- | --- |
| 1 | 1 | 0010 | |
| 1 | 1 | 0100 | |
| 1 | 1 | 0101 | |
| 1 | 1 | 0110 | |
| 1 | 1 | 0111 | |
| 1 | 1 | 1000 | |
| 1 | 1 | 1001 | |
| 1 | 1 | 1010 | |
| 1 | 1 | 1011 | |
| 1 | 1 | 1101 | |
| 1 | 1 | 1110 | |

In the implementation of this link, a FIFO and serializer and deserializers are needed. Therefore, there is latency between the sending of the data and the receiving of the data at the other end. The latency between the RSSI and RxAGC controls in the SECONDARY channel is important because the latency must satisfy AGC loop operational parameters. To satisfy this latency, a latency specification is used. It is defined as the round trip time between the RxAGC data entering the radio to the time the RSSI (RX_DET) data leaving as shown in FIG. 12-4. This latency is, of course, radio specific because the signal flows through analog data converters and variable gain amplifiers. Each radio will provide a latency specification in the cfg setup table for the baseband (Registers offset 97–109). Each latency specification corresponds to the latency for the same sub-channel on both Tx and Rx.

For 802.11b, it is recommended to specify the latency to be 40 reference clocks, where the reference clock frequency is 44 MHz. For 802.11a, it is recommended to specify the latency to be 2 reference clocks, where the reference clock frequency is 40 MHz.

Read/write configuration registers, cfg, define a set, for example of 4096x8b register bank, inside the radio. The cfg registers store the link configuration table and any radio specific data. If the radio does not use all the registers, the higher address can be ignored and not implemented in hardware. Since the radio is a dedicated device, the baseband always initiate a cfg access. For both read and write access, one packet is sent from the baseband to the radio, followed by a response packet sent from the radio back to the baseband. For cfg read, the baseband sends a read packet with the address to the radio, and then the radio will send back the requested data as shown in FIG. 12-5. For cfg write, the baseband sends a write packet with the address and data, then the radio will echo back a packet that contains the data that was written into the specific address as shown in FIG. 12-6. The echo can be used to detect any errors in the cfg write command due to bit errors on the link. The round trip latency for both read and write access may be specified to be less than 50 periods of the refclk, where refclk is 44 MHz for 802.11b and 40 MHz for 802.11a.

An example of packet structure of a cfg read is defined in below, while the same for cfg write is defined below that. The cfg register table contains the link setup information as well as any user defined data. The first 32 address are for general link control and setup. The next 128 addresses are for first radio setup, followed by another 128 addresses for the second radio setup. The rest of the addresses from 288 to 4095 are for radio specific data.

Table III is an example of one possible register address/use scheme.

TABLE III

| Address | NAME | Comments |
|---|---|---|
| 0–4 | Reserved | |
| 5 | Link setup base address [7:0] | 32 = first radio, for 802.11b, 160 = second radio, for 802.11a/g, Hard reset will clear this register to 32. Baseband will write to this choice before bringing the link to full speed |
| 6 | Link setup base address [15:8] | |
| 7 | Link mode | 0 = minimum configuration, 1 = full speed Hard reset will clear this register to 0. When 0, the link will run at lowest speed with cfg packet size defined in first radio. Baseband writes 1 to this register to bring the link up to full speed |
| 8 | refclk frequency | 0 = 44 MHz, 1 = 40 MHz Hard reset will clear this register to 0. Baseband may write to this after hard reset before bringing the link to full speed |
| 9 | Reserved | |
| 10 | Radio device ID [7:0] | |
| 11 | Radio device ID [15:8] | |
| 12 | Radio device ID [23:16] | |
| 13 | Radio device ID [31:24] | |
| 14–31 | Reserved | |

There are two identical banks of register definition for two radio setups for potential use in dual mode radios. For the first radio, the address is 32+offset, whereas for the second radio, the address is 160+offset. The choice of which bank to use is made in registers 5 and 6 where the base address is stored.

Table IV is one possible link setup register map.

TABLE IV

| Offset | NAME | Comments |
|---|---|---|
| 0–13 | Reserved | |
| 14 | RXCLK speed | Freq = value * refclk, value is integer |
| 15 | RXDATA width | |
| 16 | TXCLK speed | Freq = value * refclk |
| 17 | TXDATA width | |
| 18 | Rx primary channel speed | Freq = value * refclk, value is {bbbb.bbbb} Max speed = 15*refclk Min speed = refclk/15 |
| 19 | Rx primary channel width, type | width[3:0], type[3:0] = value |
| 20 | Reserved | |
| 21 | Tx primary channel speed | Freq = value * refclk |
| 22 | Tx primary channel width, type | width[3:0], type[3:0] = value |
| 23 | Reserved | |
| 24 | Reserved | |
| 25 | Tx sub-channel 0010 speed | Freq = refclk/value Max speed = refclk Min speed = refclk/255 |
| 26 | Tx sub-channel 0010 width, type | width[3:0], type[3:0] = value |
| 27 | Reserved | |
| 28 | Reserved | |
| 29 | Tx sub-channel 0100 speed | |
| 30 | Tx sub-channel 0100 width, type | |
| 31 | Tx sub-channel 0101 speed | |
| 32 | Tx sub-channel 0101 width, type | |
| 33 | Tx sub-channel 0110 speed | |
| 34 | Tx sub-channel 0110 width, type | |
| 35 | Tx sub-channel 0111 speed | |
| 36 | Tx sub-channel 0111 width, type | |
| 37 | Tx sub-channel 1000 speed | |
| 38 | Tx sub-channel 1000 width, type | |
| 39 | Tx sub-channel 1001 speed | |
| 40 | Tx sub-channel 1001 width, type | |
| 41 | Tx sub-channel 0110 speed | |
| 42 | Tx sub-channel 0110 width, type | |
| 43 | Tx sub-channel 0111 speed | |
| 44 | Tx sub-channel 0111 width, type | |
| 45 | Tx sub-channel 1000 speed | |
| 46 | Tx sub-channel 1000 width, type | |
| 47 | Tx sub-channel 1001 speed | |
| 48 | Tx sub-channel 1001 width, type | |
| 49 | Tx sub-channel 1010 speed | |
| 50 | Tx sub-channel 1010 width, type | |
| 51 | Tx sub-channel 1011 speed | |
| 52 | Tx sub-channel 1011 width, type | |
| 53 | Reserved | |
| 54 | Reserved | |
| 55 | Tx sub-channel 1101 speed | |
| 56 | Tx sub-channel 1101 width, type | |
| 57 | Tx sub-channel 1110 speed | |
| 58 | Tx sub-channel 1110 width, type | |
| 59 | Reserved | |
| 60 | Reserved | |
| 61 | Rx sub-channel 0010 speed | |
| 62 | Rx sub-channel 0010 width, type | |
| 63 | Reserved | |
| 64 | Reserved | |
| 65 | Rx sub-channel 0100 speed | |
| 66 | Rx sub-channel 0100 width, type | |
| 67 | Rx sub-channel 0101 speed | |
| 68 | Rx sub-channel 0101 width, type | |
| 69 | Rx sub-channel 0110 speed | |
| 70 | Rx sub-channel 0110 width, type | |
| 71 | Rx sub-channel 0111 speed | |
| 72 | Rx sub-channel 0111 width, type | |
| 73 | Rx sub-channel 1000 speed | |
| 74 | Rx sub-channel 1000 width, type | |
| 75 | Rx sub-channel 1001 speed | |
| 76 | Rx sub-channel 1001 width, type | |
| 77 | Rx sub-channel 0110 speed | |

TABLE IV-continued

| Offset | NAME | Comments |
|---|---|---|
| 78 | Rx sub-channel 0110 width, type | |
| 79 | Rx sub-channel 0111 speed | |
| 80 | Rx sub-channel 0111 width, type | |
| 81 | Rx sub-channel 1000 speed | |
| 82 | Rx sub-channel 1000 width, type | |
| 83 | Rx sub-channel 1001 speed | |
| 84 | Rx sub-channel 1001 width, type | |
| 85 | Rx sub-channel 1010 speed | |
| 86 | Rx sub-channel 1010 width, type | |
| 87 | Rx sub-channel 1011 speed | |
| 88 | Rx sub-channel 1011 width, type | |
| 89 | Reserved | |
| 90 | Reserved | |
| 91 | Rx sub-channel 1101 speed | |
| 92 | Rx sub-channel 1101 width, type | |
| 93 | Rx sub-channel 1110 speed | |
| 94 | Rx sub-channel 1110 width, type | |
| 95 | Reserved | |
| 96 | Reserved | |
| 97 | sub-channel 0010 TxRx pair latency | Latency (seconds) = Value/refclk |
| 98 | Reserved | |
| 99 | sub-channel 0100 TxRx pair latency | |
| 100 | sub-channel 0101 TxRx pair latency | |
| 101 | sub-channel 0110 TxRx pair latency | |
| 102 | sub-channel 0111 TxRx pair latency | |
| 103 | sub-channel 1000 TxRx pair latency | |
| 104 | sub-channel 1001 TxRx pair latency | |
| 105 | sub-channel 1010 TxRx pair latency | |
| 106 | sub-channel 1011 TxRx pair latency | |
| 107 | Reserved | |
| 108 | sub-channel 1101 TxRx pair latency | |
| 109 | sub-channel 1110 TxRx pair latency | |
| 110 | Reserved | |
| 111–127 | Reserved | For link setup future use |
| User data: | | |
| 288–4095 | Radio specific data | |

Table V is one possible channel type configuration.

TABLE V

| Type | Description | Comments |
|---|---|---|
| 0000 | Unused | |
| 0001 | Active | |
| 0011 | Active, allow underflow | |

As an example, a digital interface can be added to the radio by setting up the link as follows. For the direction from radio to baseband, the PRIMARY_I and PRIMARY_Q channels are both set to 6 bits at 22 MHz for the receive ADC's. RX_DET (equivalent to RSSI) is set to SECONDARY 0010 with 6 bits at 2.2 MHz. For the direction from baseband to radio, the PRIMARY_I and PRIMARY_Q channels are both set to 8 bits at 44 MHz for the transmit DACs'. RX_AGC is set to SECONDARY 0010 with 6 bits at 2.2 MHz.

Pins TX_GC, TXON, RXON, RF_GAIN, PAENB, RX_LK, SHDNB, DIN, SCLK, DOUT, and CSB are handled by radio specific configuration bits. Table VI is one possible general setup configuration.

TABLE VI

| Addr | NAME | Comments | Value |
|---|---|---|---|
| 0–4 | Reserved | | |
| 5 | Link setup base address [7:0] | 32 = first radio, for 802.11b, 160 = second radio, for 802.11a/g, Hard reset will clear this register to 32. Baseband will write to this choice before bringing the link to full speed | 32 |
| 6 | Link setup base address [15:8] | | 0 |
| 7 | Link mode | 0 = minimum configuration, 1 = full speed Hard reset will clear this register to 0. When 0, the link will run at lowest speed with cfg packet size defined in first radio. Baseband writes 1 to this register to bring the link up to full speed | 0 |
| 8 | refclk frequency | 0 = 44 MHz, 1 = 40 MHz Hard reset will clear this register to 0. Baseband may write to this after hard reset before bringing the link to full speed | 0 |
| 9 | Reserved | | |
| 10 | Radio device ID [7:0] | | 0 |
| 11 | Radio device ID [15:8] | | 0 |
| 12 | Radio device ID [23:16] | | 0 |
| 13 | Radio device ID [31:24] | | 0 |
| 14–31 | Reserved | | |

Table VII is one possible configuration for link setup where a base address is 32.

TABLE VII

| Offset | NAME | Comments | Value |
|---|---|---|---|
| 0–13 | Reserved | | |
| 14 | RXCLK speed | Freq = value * refclk, value is integer | 11, for speed of 484 MHz |
| 15 | RXDATA width | | 1 |
| 16 | TXCLK speed | Freq = value * refck | 11, for speed of 484 MHz |
| 17 | TXDATA width | | 1 |
| 18 | Rx primary channel speed | Freq = value * refclk, value is {bbbb.bbbb} Max speed = 15 * refclk Min speed = refclk/15 | {0000.1000} for speed of 22 MHz |
| 19 | Rx primary channel width, type | width[3:0], type[3:0] = value | Width = 6, type = 0001 |
| 20 | Reserved | | |
| 21 | Tx primary channel speed | Freq = value * refclk | {0001.0000}, for speed of 44 MHz |

TABLE VII-continued

| Offset | NAME | Comments | Value |
|---|---|---|---|
| 22 | Tx primary channel width, type | width[3:0], type[3:0] = value | Width = 8, type = 0001 |
| 23 | Reserved | | |
| 24 | Reserved | | |
| 25 | Tx sub-channel 0010 speed | Freq = refclk/value<br>Max speed = refclk<br>Min speed = refclk/255 | 20, for speed of 2.2 MHz |
| 26 | Tx sub-channel 0010 width, type | width[3:0], type[3:0] = value | Width = 6, type = 0011 |
| 27 | Reserved | | |
| 28 | Reserved | | |
| 29 | Tx sub-channel 0100 speed | | N/A |
| 30 | Tx sub-channel 0100 width, type | | Width = N/A, type = 0000 |
| 31 | Tx sub-channel 0101 speed | | N/A |
| 32 | Tx sub-channel 0101 width, type | | Width = N/A, type = 0000 |
| 33 | Tx sub-channel 0110 speed | | N/A |
| 34 | Tx sub-channel 0110 width, type | | Width = N/A, type = 0000 |
| 35 | Tx sub-channel 0111 speed | | N/A |
| 36 | Tx sub-channel 0111 width, type | | Width = N/A, type = 0000 |
| 37 | Tx sub-channel 1000 speed | | N/A |
| 38 | Tx sub-channel 1000 width, type | | Width = N/A, type = 0000 |
| 39 | Tx sub-channel 1001 speed | | N/A |
| 40 | Tx sub-channel 1001 width, type | | Width = N/A, type = 0000 |
| 41 | Tx sub-channel 0110 speed | | N/A |
| 42 | Tx sub-channel 0110 width, type | | Width = N/A, type = 0000 |
| 43 | Tx sub-channel 0111 speed | | N/A |
| 44 | Tx sub-channel 0111 width, type | | Width = N/A, type = 0000 |
| 45 | Tx sub-channel 1000 speed | | N/A |
| 46 | Tx sub-channel 1000 width, type | | Width = N/A, type = 0000 |
| 47 | Tx sub-channel 1001 speed | | N/A |
| 48 | Tx sub-channel 1001 width, type | | Width = N/A, type = 0000 |
| 49 | Tx sub-channel 1010 speed | | N/A |
| 50 | Tx sub-channel 1010 width, type | | Width = N/A, type = 0000 |
| 51 | Tx sub-channel 1011 speed | | N/A |
| 52 | Tx sub-channel 1011 width, type | | Width = N/A, type = 0000 |
| 53 | Reserved | | |
| 54 | Reserved | | |
| 55 | Tx sub-channel 1101 speed speed | | N/A |
| 56 | Tx sub-channel 1101 width, type | | Width = N/A, type = 0000 |
| 57 | Tx sub-channel 1110 speed | | N/A |
| 58 | Tx sub-channel 1110 width, type | | Width = N/A, type = 0000 |
| 59 | Reserved | | |
| 60 | Reserved | | |
| 61 | Rx sub-channel 0010 speed | | 20 |
| 62 | Rx sub-channel 0010 width, type | | Width = 6, type = 0011 |
| 63 | Reserved | | |

TABLE VII-continued

| Offset | NAME | Comments | Value |
|---|---|---|---|
| 64 | Reserved | | |
| 65 | Rx sub-channel 0100 speed | | N/A |
| 66 | Rx sub-channel 0100 width, type | | Width = N/A, type = 0000 |
| 67 | Rx sub-channel 0101 speed | | N/A |
| 68 | Rx sub-channel 0101 width, type | | Width = N/A, type = 0000 |
| 69 | Rx sub-channel 0110 speed | | N/A |
| 70 | Rx sub-channel 0110 width, type | | Width = N/A, type = 0000 |
| 71 | Rx sub-channel 0111 speed | | N/A |
| 72 | Rx sub-channel 0111 width, type | | Width = N/A, type = 0000 |
| 73 | Rx sub-channel 1000 speed | | N/A |
| 74 | Rx sub-channel 1000 width, type | | Width = N/A, type = 0000 |
| 75 | Rx sub-channel 1001 speed | | N/A |
| 76 | Rx sub-channel 1001 width, type | | Width = N/A, type = 0000 |
| 77 | Rx sub-channel 0110 speed | | N/A |
| 78 | Rx sub-channel 0110 width, type | | Width = N/A, type = 0000 |
| 79 | Rx sub-channel 0111 speed | | N/A |
| 80 | Rx sub-channel 0111 width, type | | Width = N/A, type = 0000 |
| 81 | Rx sub-channel 1000 speed | | N/A |
| 82 | Rx sub-channel 1000 width, type | | Width = N/A, type = 0000 |
| 83 | Rx sub-channel 1001 speed | | N/A |
| 84 | Rx sub-channel 1001 width, type | | Width = N/A, type = 0000 |
| 85 | Rx sub-channel 1010 speed | | N/A |
| 86 | Rx sub-channel 1010 width, type | | Width = N/A, type = 0000 |
| 87 | Rx sub-channel 1011 speed | | N/A |
| 88 | Rx sub-channel 1011 width, type | | Width = N/A, type = 0000 |
| 89 | Reserved | | |
| 90 | Reserved | | |
| 91 | Rx sub-channel 1101 speed | | N/A |
| 92 | Rx sub-channel 1101 width, type | | Width = N/A, type = 0000 |
| 93 | Rx sub-channel 1110 speed speed | | N/A |
| 94 | Rx sub-channel 1110 width, type | | Width = N/A, type = 0000 |
| 95 | Reserved | | |
| 96 | Reserved | | |
| 97 | sub-channel 0010 TxRx pair latency | Latency (seconds) = Value/refclk | 40 |
| 98 | Reserved | | |
| 99 | sub-channel 0100 TxRx pair latency | | N/A |
| 100 | sub-channel 0101 TxRx pair latency | | N/A |
| 101 | sub-channel 0110 TxRx pair latency | | N/A |
| 102 | sub-channel 0111 TxRx pair latency | | N/A |
| 103 | sub-channel 1000 TxRx pair latency | | N/A |
| 104 | sub-channel 1001 TxRx pair latency | | N/A |

TABLE VII-continued

| Offset | NAME | Comments | Value |
|---|---|---|---|
| 105 | sub-channel 1010 TxRx pair latency | | N/A |
| 106 | sub-channel 1011 TxRx pair latencv pair latency | | N/A |
| 107 | Reserved | | |
| 108 | sub-channel 1101 TxRx pair latency | | N/A |
| 109 | sub-channel 1110 TxRx pair latency | | N/A |
| 110 | Reserved | | |
| 111–127 | Reserved | For link setup future use | |

Table VIII is an example of some radio specific data that may be used.

TABLE VIII

| Addr | Name | Comments |
|---|---|---|
| 288 | TX_GC | TxAGC control |
| 289 | TXON, RXON, RF_GAIN, PAENB, RX_1K, SHDNB, | General radio control bits |
| 290 | DIN | The registers 290–293 emulate the 4-wire serial interface on the radio |
| 291 | CSB | |
| 292 | SCLK | |
| 293 | DOUT | |

The link needs a set of differential signal pins as defined below. The minimum configuration for this implementation is 8 pins where N=M=0. Table IX is a table of link signals.

TABLE IX

| Signal Name | Description |
|---|---|
| RXDATA[N:0] | Radio data output line |
| RXCLK | Radio data output clock |
| TXDATA[M:0] | Radio data input line |
| TXCLK | Radio data input clock |

As an example, a conventional 802.11b radio would use only 8 pins with RXCLK and TXCLK running at 484 MHz. For a conventional 802.11a radio, the radio would use only 8 pins with RXCLK and TXCLK running at 880 MHz.

The packets sent over the high speed serial data link are organized in a manner to efficiently handle the data types. The packet is constructed with a 2 bit header and payload size that is defined by the radio in the link setup. The payload size can be different for various data types.

The "Sync Packet" is a special packet used to define the packet boundaries. It carries null data. Table X is an example of a possible sync packet header.

TABLE X

| Header 2 b | Payload width is the same as PRIMARY channel |
|---|---|
| 0  0 | All 1's |

As an example, for 802.11b, the packet would be 10 bits with contents "0011111111", while for 802.11a, the packet would be 12 bits with contents "001111111111".

The PRIMARY I or Q channel packet is data for I and Q channels. The number of bits in the payload is set by radio. An example of PRIMARY I and Q headers is shown in Table XI.

TABLE XI

| Header 2 b | Payload width is defined by radio |
|---|---|
| 0  1 | PRIMARY Q channel |
| 1  0 | PRIMARY I channel |

As an example, for 802.11 b, the packet would be 10 bits with contents 2b(header)+8b (data), while for 802.11a, the packet would be 12 bits with contents 2b(header)+10b(data).

The secondary channel is used for auxiliary converters such as RSSI. There can be 16 secondary channels, each specified by a 4b subheader. Two channels are reserved for use by the cfg, and 3 channels are reserved for system use (see below for re-synchronization). So, 11 sub-channels are available to the user in this implementation. The sub-channel width and speed are defined in the setup cfg table. Table XII provides examples of possible packet structures.

TABLE XII

| Header 2 b | | Subheader | |
|---|---|---|---|
| 1 | 1 | 0010 | Payload defined by radio |
| 1 | 1 | 0100 | |
| 1 | 1 | 0101 | |
| 1 | 1 | 0110 | |
| 1 | 1 | 0111 | |
| 1 | 1 | 1000 | |
| 1 | 1 | 1001 | |
| 1 | 1 | 1010 | |
| 1 | 1 | 1011 | |
| 1 | 1 | 1101 | |
| 1 | 1 | 1110 | |
| 1 | 1 | 0000 | Cfg read |
| 1 | 1 | 0001 | Cfg write |
| 1 | 1 | 0011 | Reserved |
| 1 | 1 | 1100 | Reserved |
| 1 | 1 | 1111 | Reserved |

Possible packet structures from baseband to radio are shown in Table XIII

TABLE XIII

| Header 2 b | | Subheader | Payload defined by radio |
|---|---|---|---|
| 1 | 1 | 0000 | 12b + padding of 1's |
| 1 | 1 | 0000 | 802.11b example, "12b data" + "11" |
| 1 | 1 | 0000 | 802.11a example, "12b data" + "111111" |

The address of the cfg register is 12 bits. The payload will be padded until the length of the packet is an integer multiple of the minimum packet size. For example, for 802.11b, the minimum packet size is 2b+8b=10b, so the cfg read packet size is 2b (header)+4b (subheader)+12b (address)+2b (padding)=20b. For 802.11a, the minimum packet size is 2b+10b=12b, so the cfg read packet size is 2b (header)+4b (subheader)+12b (address)+6b (padding)=24b.

After the data is retrieved, the data is sent back to the baseband using another cfg read packet with the same size. However, the data is only 8 bits, so the extra space is padded with 1's.

Possible packet structures from radio to baseband are shown in Table XIV

TABLE XIV

| Header 2 b | Subheader | Payload defined by radio |
|---|---|---|
| 1 1 | 0000 | 8b + padding of 1's |
| 1 1 | 0000 | 802.11b example, "8b data" + "111111" |
| 1 1 | 0000 | 802.11a example, "8b data" + "1111111111" |

For example, for 802.11b, the minimum packet size is 2b+8b=10b, so the cfg read packet size is 2b (header)+4b (subheader)+8b (data)+6b (padding of 1's)=20b. For 802.11a, the minimum packet size is 2b+10b=12b, so the cfg read packet size is 2b (header)+4b (subheader)+8b (address)+10b (padding of 1's)=24b.

Possible packet structures from baseband to radio for secondary channel cfg write are shown in Table XV.

TABLE XV

| Header 2 b | Subheader | Payload defined by radio |
|---|---|---|
| 1 1 | 0000 | 12b (address) + 8b (data) + padding of 1's |
| 1 1 | 0000 | 802.11b example, "12b address" + "8b data" + "1111" |
| 1 1 | 0000 | 802.11a example, "12b data" + "8b data" + "1111111111" |

The address of the cfg register is 12 bits, and the data is 8b. The payload will be padded until the length of the packet is an integer multiple of the minimum packet size. For example, for 802.11b, the minimum packet size is 2b+8b=10b, so the cfg write packet size is 2b(header)+4b (subheader)+12b(address)+8b(data)+4b (padding)=30b. For 802.11a, the minimum packet size is 2b+10b=12b, so the cfg read packet size is 2b (header)+4b (subheader)+12b (address)+8b(data)+10b (padding)=36b.

After the data is written to registers in the radio, the data written is echoed back for confirmation using another cfg write packet with the same size and content. This packet is identical to the previous packet from baseband to radio for cfg write.

In this link design, the data is sent on both edges of the clock. So, due to the double data rate nature of this data transfer, the radio must select an even number of bits for the payload for easier decoding. As a result, the serializer must take an even number of parallel bits.

Hard reset on the link will be asserted from the baseband. When the baseband pulls low both the positive and negative pins of a differential data signal TXDATA[0], the link will be reset. Cfg register 5 for link setup base address will be cleared to 32, and register 7 for link mode will be set to 0. Furthermore, the radio will power down and turn off any external oscillator for deep sleep mode.

Coming out of reset, the link will be set to the minimum bandwidth configuration. The link speed is set to the refclk frequency, where the refclk frequency is 44 MHz for 802.11b and 40 MHz for 802.11a. The RXDATA and TXDATA width will be set to 1b. First, the link will need to synchronize the packet boundaries. The link will only send pairs of SYNC packets and wait for pairs of SYNC packets from the other side. Once valid SYNC packets are received, the link can synchronize the packet boundary (see below for boundary detection method).

Then the link will configure itself automatically based on link setup cfg registers. Using cfg reads, the baseband will be able to get the Device ID, the final link speed, the final data width for RXDATA and TXDATA, the speed and width for the PRIMARY I and Q channels, the speed and width for every SECONDARY channel. The cfg registers shows detailed information on the registers used to setup the link on the baseband side.

Once the baseband obtained all the required setup information, it will set the link mode register 7 to "1". This will tell the radio to bring the link up to full speed.

Sometimes the link can get confused about the packet boundaries due to errors in the transmission. By monitoring the FIFO's on the link for overflow and underflow. The link can discover if the packet boundary is misaligned. In such cases, each side of the link will only send pairs of SYNC packets and wait for pairs of SYNC packets from the other side. Once valid SYNC packets are received, the link can synchronize the packet boundary.

The method to look for SYNC packets is as follows. As an example for 802.11b, the SYNC packet pair is "001111111100111111". There are only 4 possible header patterns seen by the parser since the DDR interface does not permit a single bit shift. So, the parser will choose from the following packets:

"001111": valid sync packet

"111111": secondary channel 1111, reserved

"111100": secondary channel 1100, reserved

"110011": secondary channel 0011, reserved

Since the 3 sub-channels are reserved and should never occur, the parser will be able to detect the sync packet correctly.

There is no error detection proposed for Stream I/Q or SECONDARY channel RSSI stream data because the bit error rate from the data itself is much higher than the link error rate. To prevent accidentally setting the wrong cfg bits on the radio, all cfg data that is written is echoed back to the baseband. The baseband can check for consistency and correct the mistake if necessary.

While foregoing is directed to embodiments in accordance with one or more aspects of the present invention, other and further embodiments of the present invention may be devised without departing from the scope thereof, which is determined by the claims that follow. comer Claims listing steps do not imply any order of the steps unless such order is expressly indicated.

All trademarks are the respective property of their owners.

What is claimed is:

1. A programmable digital interface for transmitting data between an input/output controller and a transceiver, comprising:

the transceiver including a programmable radio interface configured to output incoming stream data to the input/output controller at a first bit-rate determined using first information provided by the input/output controller and configured to receive outgoing stream data from the input/output controller at a second bit-rate determined using second information provided by the input/output controller; and the input/output controller including a baseband processor and medium access controller interface configured to output the outgoing stream data to the transceiver at the second bit-rate and configured to receive the incoming stream data from the transceiver at the first bit-rate.

2. The programmable digital interface according to claim 1, wherein the first information includes a value that specifies a receive clock frequency.

3. The programmable digital interface according to claim 1, wherein the first information includes a receive data width.

4. The programmable digital interface according to claim 1, wherein the second information includes a value that specifies a transmit clock frequency.

5. The programmable digital interface according to claim 1, wherein the second information includes a transmit data width.

6. The programmable digital interface according to claim 1, wherein the transceiver is configured to receive a 40 MHz reference clock.

7. The programmable digital interface according to claim 1, wherein the transceiver is configured to receive a 44 MHz reference clock.

8. The programmable digital interface according to claim 1, wherein the incoming stream data is output to a single pair of differential signals.

9. The programmable digital interface according to claim 1, wherein the outgoing stream data is output to a single pair of differential signals.

10. The programmable digital interface according to claim 1, wherein the outgoing stream data is output to a single data wire and the incoming stream data is output to a single data wire.

11. An input/output controller including a baseband processor and medium access controller interface for receiving and transmitting data streams, comprising:

a single pair of differential signals configured to receive a receive clock;

a single pair of differential signals configured to receive first data streams and configuration information from a transceiver synchronous with the receive clock;

a single pair of differential signals configured to output a transmit clock; and a single pair of differential signals configured to output second data streams and configuration information to a transceiver synchronous with the transmit clock.

12. The input/output controller according to claim 11, wherein the baseband processor and medium access controller interface is coupled to a transceiver configured to support wireless communication.

13. The input/output controller according to claim 12, wherein the baseband processor and medium access controller interface is configured to reset the transceiver by negating or asserting both differential signals included in the single pair of differential signals configured to output the second data streams.

14. The input/output controller according to claim 11, further comprising a clock multiplier configured to receive the receive clock and generate the transmit clock.

15. The input/output controller according to claim 11, wherein the second data streams include four types of data.

16. A transceiver, comprising
an incoming data stream serializer configured to receive incoming data streams and output a first data stream of programmable width and a first clock; and an outgoing data stream deserializer configured to receive a second data stream of programmable width and a second clock and output outgoing data streams.

17. The transceiver according to claim 16, wherein the transceiver is further configured to operate at a minimum bandwidth configuration following a reset.

18. The transceiver according to claim 16, further comprising at least one antenna coupled to the transceiver.

19. The transceiver according to claim 16, wherein the transceiver is coupled to a baseband subsystem, the baseband subsystem including an input/output controller.

20. The transceiver according to claim 16, wherein the incoming data stream is received by a single pair of differential inputs.

21. The transceiver according to claim 16, wherein the outgoing data stream is output by a single pair of differential outputs.

22. The transceiver according to claim 16, further comprising a set of configuration registers configured to store the first data stream width, the second data stream width, a value that specifies the first clock frequency, and a value that specifies the second clock frequency.

* * * * *